US012612055B2

(12) United States Patent
Ishikawa

(10) Patent No.: US 12,612,055 B2
(45) Date of Patent: Apr. 28, 2026

(54) INFORMATION PROCESSING APPARATUS, INFORMATION PROCESSING METHOD, AND PROGRAM

(71) Applicant: SONY GROUP CORPORATION, Tokyo (JP)

(72) Inventor: Tatsuya Ishikawa, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 715 days.

(21) Appl. No.: 17/633,738

(22) PCT Filed: Aug. 11, 2020

(86) PCT No.: PCT/JP2020/030582
§ 371 (c)(1),
(2) Date: Feb. 8, 2022

(87) PCT Pub. No.: WO2021/049233
PCT Pub. Date: Mar. 18, 2021

(65) Prior Publication Data
US 2022/0324468 A1     Oct. 13, 2022

(30) Foreign Application Priority Data

Sep. 11, 2019     (JP) ................................. 2019-165365

(51) Int. Cl.
*B60W 50/02*          (2012.01)
*B60W 40/04*          (2006.01)
(Continued)

(52) U.S. Cl.
CPC ........ *B60W 50/0205* (2013.01); *B60W 40/04* (2013.01); *B60W 40/06* (2013.01);
(Continued)

(58) Field of Classification Search
CPC .. B60W 50/00; B60W 50/02; B60W 50/0205; B60W 40/00; B60W 40/02;
(Continued)

(56) References Cited

U.S. PATENT DOCUMENTS

2003/0021445 A1   1/2003  Larice
2016/0063717 A1*  3/2016  Sasaki ................... G01S 7/4972
                                                                    345/419
(Continued)

FOREIGN PATENT DOCUMENTS

CN          103189904 A      7/2013
CN          109933043 A      6/2019
(Continued)

*Primary Examiner* — Khoi H Tran
*Assistant Examiner* — Sarah A Tran
(74) *Attorney, Agent, or Firm* — Paratus Law Group, PLLC

(57)          ABSTRACT

There is provided an information processing apparatus, an information processing method, and a program, with which an abnormality of a sensor mounted on a vehicle can be detected. The information processing apparatus includes a first data acquisition unit, a second data acquisition unit, a comparison unit, and a detection unit. The first data acquisition unit acquires first data generated by using sensing data of a sensor mounted on a vehicle. The second data acquisition unit acquires second data generated by using sensing data of a sensor other than that of the vehicle. The comparison unit compares the first data with the second data on the basis of the time stamp included in each of the first data and the second data. The detection unit detects an abnormality related to a sensor mounted on the vehicle on the basis of a comparison result by the comparison unit.

17 Claims, 18 Drawing Sheets

(51) Int. Cl.
  *B60W 40/06* (2012.01)
  *G08G 1/16* (2006.01)
(52) U.S. Cl.
  CPC ....... *G08G 1/16* (2013.01); *B60W 2050/0215*
    (2013.01); *B60W 2420/403* (2013.01); *B60W*
    *2420/408* (2024.01); *B60W 2552/00* (2020.02);
    *B60W 2554/4029* (2020.02); *B60W 2554/4041*
    (2020.02); *B60W 2556/45* (2020.02)
(58) Field of Classification Search
  CPC ................. B60W 40/04; B60W 40/06; B60W
    2050/0215; B60W 2420/00; B60W
    2420/40; B60W 2420/403; B60W
    2420/408; B60W 2552/00; B60W
    2552/15; B60W 2554/00; B60W 2554/40;
    B60W 2554/402; B60W 2554/404; B60W
    2554/4029; B60W 2554/4041; B60W
    2556/00; B60W 2556/45; B60W 2556/50;
    G08G 1/00; G08G 1/01; G08G 1/0104;
    G08G 1/0108; G08G 1/16; G08G 1/0112;
    G01S 7/00; G01S 7/02; G01S 7/40; G01S
    7/48; G01S 7/497; G01S 7/4052; G01S
    7/4082; G01S 7/4091; G01S 7/4972;
    G01S 13/00; G01S 13/86; G01S 13/88;
    G01S 13/93; G01S 13/865; G01S 13/87;
    G01S 13/931; G01S 17/931; G01S
    2013/9323; G01S 2013/9316
  See application file for complete search history.

(56) References Cited

U.S. PATENT DOCUMENTS

| | | | | |
|---|---|---|---|---|
| 2016/0171315 | A1* | 6/2016 | Yi ........................ | H04N 13/204 |
| | | | | 382/154 |
| 2017/0358204 | A1 | 12/2017 | Modica | |
| 2019/0086512 | A1 | 3/2019 | Bilik et al. | |
| 2023/0079730 | A1* | 3/2023 | Gotoda ................. | G01S 13/931 |
| | | | | 701/23 |

FOREIGN PATENT DOCUMENTS

| | | | |
|---|---|---|---|
| JP | 2010-126130 | A | 6/2010 |
| JP | 2015-075382 | A | 4/2015 |
| JP | 2016-045150 | A | 4/2016 |
| JP | 2016-053563 | A | 4/2016 |
| JP | 2019-066240 | A | 4/2019 |
| WO | WO 2018/212346 | A1 | 11/2018 |

* cited by examiner (A)

(B)

(A)                    (B)

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2020/030582 (filed on Aug. 11, 2020) under 35 U.S.C. § 371, which claims priority to Japanese Patent Application No. 2019-165365 (filed on Sep. 11, 2019), which are all hereby incorporated by reference in their entirety.

TECHNICAL FIELD

The present technology relates to an information processing apparatus, an information processing method, and a program that are associated with abnormality detection for a sensor mounted on a vehicle such as an automobile.

BACKGROUND ART

Patent Literature 1 has described an abnormality diagnosis apparatus in a self-vehicle such as an automobile. In Patent Literature 1, environment information related to a self-vehicle surrounding environment, which is acquired by a sensor of the self-vehicle, is compared with past environment information similar to the environment information, and a malfunction of the sensor of the self-vehicle is detected in a case where the error is equal to or larger than a threshold.

CITATION LIST

Patent Literature

Patent Literature 1: Japanese Patent Application Laid-open No. 2010-126130

DISCLOSURE OF INVENTION

Technical Problem

In Patent Literature 1, a moving object is determined and the moving object region is excluded before comparing the environment information. Therefore, the processing step of excluding the moving object is necessary and it is difficult to detect a sensor abnormality quickly.

In the present disclosure, there are provided an information processing apparatus, an information processing method, and a program, with which an abnormality of a sensor mounted on a vehicle can be detected.

Solution to Problem

An information processing apparatus according to an embodiment of the present technology includes a first data acquisition unit, a second data acquisition unit, a comparison unit, and a detection unit.

The first data acquisition unit acquires first data including at least one of position information of an object present in a vehicle surrounding environment or road surface tilt information and a time stamp indicating date and time of acquisition of the information, the position information and the road surface tilt information being generated by using sensing data of one or more sensors mounted on a vehicle.

The second data acquisition unit acquires second data including the at least one of the position information of the object present in the vehicle surrounding environment or the road surface tilt information and the time stamp indicating the date and time of acquisition of the information, the position information and the road surface tilt information being generated by using sensing data of one or more sensors other than those of the vehicle.

The comparison unit compares the first data with the second data on the basis of the time stamp included in each of the first data and the second data.

The detection unit detects an abnormality related to a sensor mounted on the vehicle on the basis of a comparison result by the comparison unit.

With such a configuration, a sensor abnormality can be quickly detected by comparing and sharing sensing data with respect to a certain common target object.

The position information may be three-dimensional position information.

The time stamp may be acquired by a global navigation satellite system (GNSS) or a vehicle-to-infrastructure communication system.

The sensor may be at least one of a camera, a millimeter-wave radar, or light detection and ranging (LiDAR).

The second data acquisition unit may acquire the second data from at least one of another vehicle different from the vehicle or a road-side unit.

The second data acquisition unit may acquire, from the road-side unit, information regarding a tilt of a road surface on which the vehicle is positioned, as the second data, the information being acquired by the road-side unit in advance.

The second data acquisition unit may acquire position information of an object as the second data, the position information being generated by using sensing data of a sensor mounted on the road-side unit, and the comparison unit may compare the first data with the second data by using the second data acquired from the road-side unit as master data.

The comparison unit may compare the first data with the second data each of which is acquired for a predetermined time.

The object present in the vehicle surrounding environment may be a marker the position of which is known and fixed.

The second data acquisition unit may acquire, from a road-side unit that acquires position information of the marker in advance, the position information of the marker as the second data.

The position information of the object present in the vehicle surrounding environment may be generated through detection of a feature amount of the object.

The detection unit may detect an abnormality in which the sensor is tilted from a correct position.

The detection unit may control the vehicle on the basis of a result of the detection.

The detection unit may control, on the basis of a result of the detection, the vehicle to correct the tilt of the sensor from the correct position.

The detection unit may control use/non-use of the sensor on the basis of a result of the detection.

The detection unit may perform, on the basis of a result of the detection, control of at least one of sensor abnormality generation notification, emergency stop of the vehicle, transition of a driving mode of the vehicle, or transition notification of the driving mode of the vehicle.

An information processing method according to an embodiment of the present technology includes: acquiring first data including at least one of position information of an object present in a vehicle surrounding environment or road surface tilt information and a time stamp indicating date and time of acquisition of the information, the position information and the road surface tilt information being generated by using sensing data of one or more sensors mounted on a vehicle; acquiring second data including the at least one of the position information of the object present in the vehicle surrounding environment or the road surface tilt information and the time stamp indicating the date and time of acquisition of the information, the position information and the road surface tilt information being generated by using sensing data of one or more sensors other than those of the vehicle; comparing the first data with the second data on the basis of the time stamp included in each of the first data and the second data; and detecting an abnormality related to a sensor mounted on the vehicle on the basis of the comparison result.

A program according to an embodiment of the present technology causes an information processing apparatus to execute processing including the steps of: acquiring first data including at least one of position information of an object present in a vehicle surrounding environment or road surface tilt information and a time stamp indicating date and time of acquisition of the information, the position information and the road surface tilt information being generated by using sensing data of one or more sensors mounted on a vehicle; acquiring second data including the at least one of the position information of the object present in the vehicle surrounding environment or the road surface tilt information and the time stamp indicating the date and time of acquisition of the information, the position information and the road surface tilt information being generated by using sensing data of one or more sensors other than those of the vehicle; comparing the first data with the second data on the basis of the time stamp included in each of the first data and the second data; and detecting an abnormality related to a sensor mounted on the vehicle on the basis of the comparison result.

MODE(S) FOR CARRYING OUT THE INVENTION

First Embodiment

[Schematic Configuration of Abnormality Detection System]

An abnormality detection system according to an embodiment of the present technology will be described with reference to FIG. 1.

Figure 1:
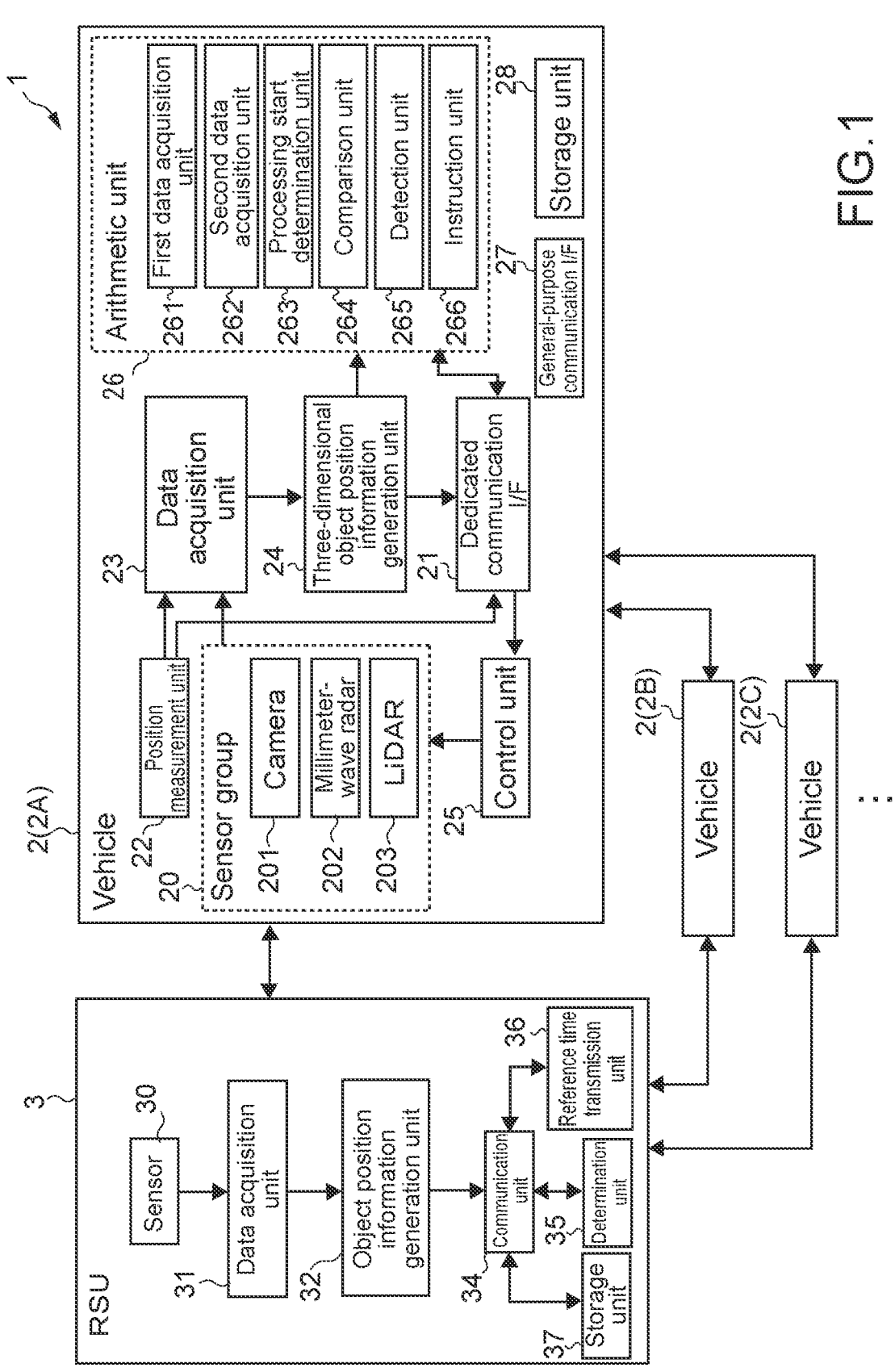
FIG. 1 A schematic configuration diagram of an abnormality detection system according to a first embodiment of the present technology.

FIG. 1 is a schematic configuration diagram of an abnormality detection system 1 and is a block diagram showing configurations of a vehicle 2 and a road side unit (hereinafter, referred to as RSU) 3, which are information processing apparatuses.

As shown in FIG. 1, the abnormality detection system 1 includes one or more vehicles 2 and the RSU 3.

Figure 11:
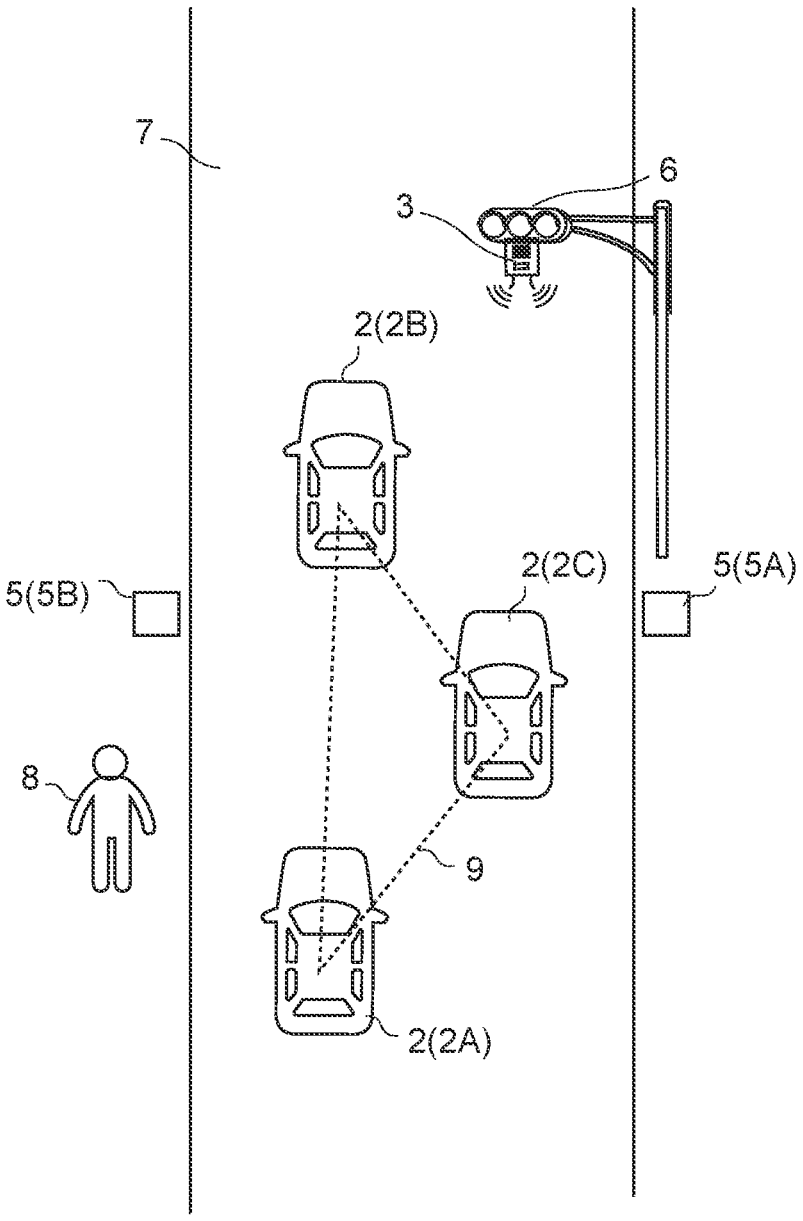
FIG. 11 A schematic diagram describing an environment example in which the abnormality detection system according to the present technology is applied.

It is assumed that the abnormality detection system 1 in this embodiment is used in an environment, for example, as shown in FIG. 11, where there are provided a GPS receiver (position measurement unit), sensors that acquire vehicle surrounding information, such as an omni-directional radar and an omni-directional camera, and the vehicles 2 capable of communicating with the RSU 3.

FIG. 11 is a schematic diagram showing a situation where a plurality of vehicles 2A to 2C is running on a road 7 in which the RSU 3 is installed. As shown in FIG. 11, the RSU 3 is installed along the road 7. In this embodiment, an example in which the RSU 3 is installed in a traffic light 6 is shown, though not limited thereto. Moreover, a plurality of (two in FIG. 11) markers 5 the positions of which are known and fixed is arranged in vicinity of the RSU 3. The markers 5 are arranged at such positions that the vehicles 2 can easily detect the markers 5. In FIG. 11, a person 8 is located on a sidewalk positioned along the road 7.

In FIG. 11, for distinguishing the plurality of vehicles 2 from one another, they are denoted by reference signs as a vehicle 2A, a vehicle 2B, and a vehicle 2C. However, unless it is particularly necessary to distinguish the plurality of vehicles 2 from one another, they will be referred to as the vehicles 2 and described. Moreover, out of the two markers 5, a marker positioned closer to the RSU 3 is denoted by the reference sign of 5A and a marker positioned that is opposite to the marker 5A sandwiching the road 7 is denoted by the reference sign of 5B. However, unless it is particularly necessary to distinguish the two markers 5 from each other, they will be referred to as the markers 5 and described.

In the vehicle 2, it is possible to detect an object such as a vehicle and a person present in a surrounding environment of a self-vehicle by utilizing sensors that recognize the surroundings, such as a radar and a camera mounted on the vehicle 2.

In the abnormality detection system 1, an abnormality of the sensors mounted on the vehicle is detected by using three-dimensional object position information of an object present in a vehicle surrounding environment, which is generated on the basis of sensing data acquired by the sensors mounted on each vehicle 2.

In addition, an abnormality of the sensors mounted on the vehicle may be detected by using object position information generated on the basis of sensing data acquired by a sensor mounted on the RSU 3 in addition to the three-dimensional object position information generated by the vehicle 2.

It will be described later in detail.

An arithmetic unit to be described later that performs a series of processing associated with sensor abnormality detection may be in the vehicle, may be in the RSU, or may be in an additionally provided server.

Descriptions will be given showing an example in which the arithmetic unit is in the vehicle in the first embodiment, an example in which the arithmetic unit is in the server in a second embodiment to be described later, and an example in which the arithmetic unit is in the RSU in a third embodiment to be described later.

[Configuration of Vehicle (Information Processing Apparatus)]

As shown in FIG. 1, the vehicle 2 includes a sensor group 20, a dedicated communication I/F 21, a position measurement unit 22, a data acquisition unit 23, a three-dimensional object position information generation unit 24, a control unit 25, an arithmetic unit 26, a general-purpose communication I/F 27, and a storage unit 28.

The sensor group 20 includes a stereo camera (hereinafter, referred to as camera) 201 serving as an imaging unit, radars using an echolocation method, such as a millimeter-wave radar 202 and light detection and ranging, laser imaging detection and ranging (LiDAR) 203, and the like. These sensors are installed in the vehicle 2 to be capable of detecting all directions and acquires surrounding information of the vehicle 2.

The camera 201 is provided in, for example, at least one position of a front nose, side-view mirrors, a rear bumper, back doors, an upper portion of a windshield in a compartment, and the like of the vehicle. The cameras provided in the front nose and the upper portion of the windshield in the compartment primarily acquire images in front of the vehicle. The cameras provided in the side-view mirrors primarily acquire images on the sides of the vehicle. The cameras provided in the rear bumper and the back doors primarily acquire images behind the vehicle. The camera provided in the upper portion of the windshield in the compartment is primarily used for detecting preceding vehicles, pedestrians, obstacles, traffic lights, traffic signs, lanes, or the like.

Object detection is mainly performed by using image data obtained from the camera 201.

The millimeter-wave radar 202 is provided in, for example, the front, the rear, the sides, the corners, and the upper portion of the windshield in the compartment of the vehicle. The LiDAR 203 is provided in, for example, the front nose, the rear bumper, the back doors, and the upper portion of the windshield in the compartment of the vehicle. The millimeter-wave radar 202 and the LiDAR 203 are used for primarily detecting preceding vehicles, pedestrians, obstacles, or the like.

A distance between the self-vehicle to the object, a direction from the self-vehicle to the object, and the speed of the object can be detected by using the millimeter-wave radar 202 and the LiDAR 203. A pulse method, a frequency modulated continuous wave (FMCW) method, and the like are generally used for detection. The millimeter-wave radar 202 detects a distance with high accuracy. A position relationship such as a distance between the self-vehicle 2 and the object can be acquired by using the millimeter-wave radar 202 and the LiDAR 203.

The millimeter-wave radar 202 mainly observes a long distance and the camera 201 and the LiDAR 203 mainly observe short and middle distances.

The dedicated communication I/F 21 is a communication I/F that supports a communication protocol designed for use in a vehicle. The dedicated communication I/F may implement, for example, a wireless access in vehicle environment (WAVE) that is a combination of IEEE802.11p of a subordinate layer with IEEE1609 of a superordinate layer, dedicated short range communications (DSRC), or a standard protocol such as a cellular communication protocol. The dedicated communication I/F 21 typically performs V2X communication that is a concept including one or more of vehicle-to-vehicle communication, vehicle-to-infrastructure communication, vehicle-to-home communication, and vehicle-to-pedestrian communication.

The dedicated communication I/F 21 is capable of transmitting and receiving data between a vehicle to a vehicle.

For example, the vehicle 2 sends three-dimensional object position information and road surface tilt information to another vehicle. Here, the three-dimensional object position information and the road surface tilt information are generated by using sensing data acquired by the sensor group 20 mounted on the self-vehicle.

The vehicle 2 receives three-dimensional object position information and road surface tilt information from the other vehicle. Here, three-dimensional object position information and road surface tilt information are generated by using sensing data acquired by the sensor group 20 mounted on the other vehicle. The received information is output to the arithmetic unit 26 of the self-vehicle.

The vehicle 2 sends abnormality notification information, which is processed by the arithmetic unit 26 of the self-vehicle, to the other vehicle.

The vehicle 2 receives abnormality notification information, which is processed by the arithmetic unit 26 of the other vehicle, from the other vehicle. The received information is output to the control unit 25.

The dedicated communication I/F 21 is capable of transmitting and receiving data between the vehicle 2 and the RSU 3.

For example, the vehicle 2 sends GPS information including a time stamp, which is acquired by the position measurement unit 22 to be described later, to the RSU 3.

The vehicle 2 receives reference time data to be used for data synchronization at the time of data matching processing, from the RSU 3.

The vehicle 2 receives information regarding a vehicle ID pair of vehicles, which is used at the time of data matching processing, from the RSU 3.

The vehicle 2 sends abnormality detection information, which is processed by the arithmetic unit 26 of the self-vehicle, to the RSU 3.

The position measurement unit 22 receives, for example, a GNSS signal from global navigation satellite system (GNSS) satellite (e.g., a GPS signal from a global positioning system (GPS) satellite), performs position measurement, and generates position information including latitude, longitude, and altitude of the vehicle. It should be noted that the position measurement unit 22 may determine a current position by exchanging signals with a wireless access point or may acquire position information from a terminal such as a portable phone, a PHS, and a smartphone having a position measurement function.

The position measurement unit 22 obtains a time stamp (time information) indicating a point of time when the position measurement is performed beside the position information of the vehicle 2 on which the position measurement unit 22 is mounted. The information obtained by the position measurement unit 22 will be referred to as GPS information including the time stamp.

The GPS information including the time stamp is sent to the RSU 3 via the dedicated communication I/F 21.

The data acquisition unit 23 acquires sensing data acquired by the camera 201, the millimeter-wave radar 202, the LiDAR 203, the position measurement unit 22, and the like.

The sensing data acquired by the camera 201 is image data.

The sensing data acquired by the millimeter-wave radar 202 and the LiDAR 203 is data associated with millimeter waves and light reflection waves.

Using the sensing data acquired by the data acquisition unit 23, the three-dimensional object position information generation unit 24 performs object detection processing and detection processing of a distance between the self-vehicle and a surrounding object, and generates position information of a three-dimensional object present in the surrounding environment of the vehicle 2.

Objects present in the surrounding environment of the vehicle 2 include, for example, moving objects such as other vehicles and people and static objects that remain stationary, such as the markers 5, signs, and buildings.

In the object detection processing, individual objects are identified by detecting feature amounts of the objects.

For example, in a case where the object is a vehicle, it is possible to detect and identify a license plate, a car type, e.g., truck or owner-driver car, a car shape, a car color, a car size, and the like as the feature amount. Here, a license plate that is information specific to each vehicle that is different for each vehicle is used.

Moreover, in a case where the object is a person, it is possible to detect and identify a height, a histogram of colors of clothes, a walking style (gait authentication), and the like as the feature amount. Here, the height of the person and colors of clothes are used.

The markers 5 are arranged in vicinity of the RSU 3 and are static objects the positions of which are known and fixed. The markers 5 may function as reference markers. In this case, position information of the markers 5 is pre-stored in a storage unit 37 of the RSU 3 to be described later as reference data.

In addition, based on the position information of the three-dimensional object present in the surrounding environment of the vehicle 2, the three-dimensional object position information generation unit 24 may generate tilt information of a road surface on which the vehicle 2 is running.

In the example shown in FIG. 11, three-dimensional object position information of each of the vehicle 2B, the vehicle 2C, the marker 5A, the marker 5B, and the person 8, which are objects present in the surrounding environment of the vehicle 2A, can be generated by using the sensing data of the sensor group 20 mounted on the vehicle 2A.

The plurality of pieces of three-dimensional object position information will be referred to as a three-dimensional object information set. This three-dimensional object information set also includes road surface tilt information. The three-dimensional object information set includes time stamps.

A generation example of the road surface tilt information will be described.

A relative position relationship between the vehicle 2A and the objects present in the surrounding environment can be acquired by using the three-dimensional object position information of the objects present in the surrounding environment of the vehicle 2A.

For example, as shown in FIG. 11, a triangle, three-dimensional virtual plane 9 formed by connecting the vehicle 2A, the vehicle 2B, and the vehicle 2C can be generated by using the three-dimensional object position information. This virtual plane 9 represents the road surface tilt information.

It should be noted that the example in which the virtual plane 9 is generated by the self-vehicle and the two other vehicles is shown here, though the virtual plane 9 may be generated by using objects other than the self-vehicle, for example, objects such as the markers 5, the person 8, and landmarks. In this embodiment, data to be compared is synchronized by using time stamps at the time of data comparison in sensor abnormality detection processing. Therefore, sensing targets to be used for the data to be compared may be moving objects or may be static objects and high environmental robustness is provided.

Figure 12:
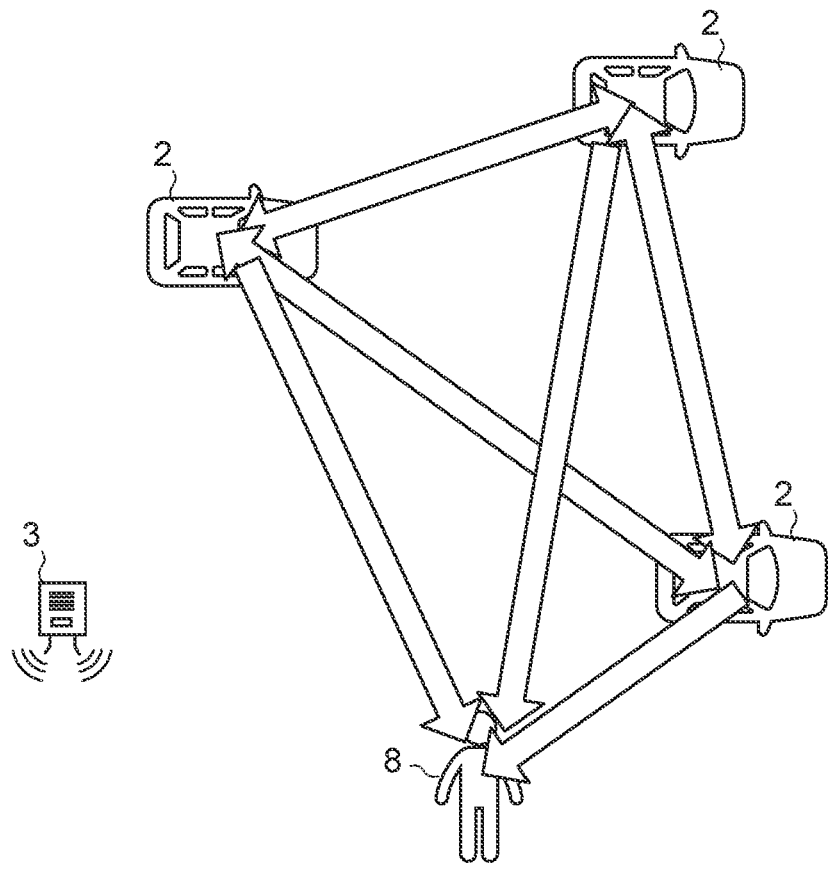
FIG. 12 A diagram showing a relationship between a vehicle and an object (vehicle, person) present in the periphery as viewed from each of the three vehicles.

FIG. 12 is a diagram showing a relationship between a vehicle and objects present in the periphery (vehicles, person) as viewed from each of the three vehicles.

Figure 13:
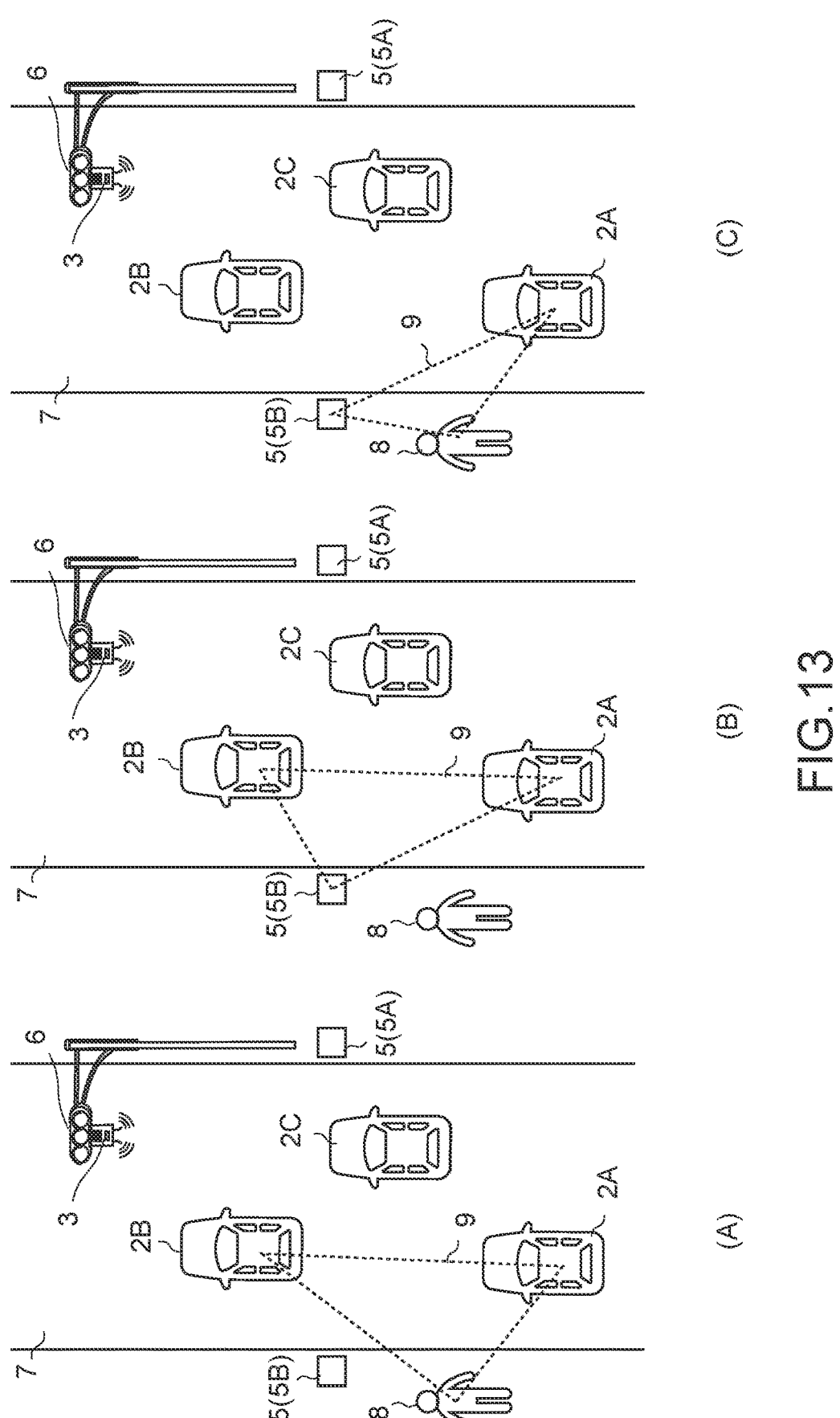
FIG. 13 A diagram describing an example of generating a virtual plane 9 by using objects other than the vehicle.

FIG. 13 is a diagram describing an example of generating the virtual plane 9 by using objects other than the vehicle.

As shown in FIG. 12, each vehicle 2 is capable of acquiring three-dimensional object position information indicating a position interrelationship between the self-vehicle, the two other vehicles, and the person 8 by using sensing data of the sensors mounted on the vehicle 2.

Therefore, a plurality of virtual planes connecting three objects can be generated.

For example, as shown in FIG. 13(A), the virtual plane 9 can be generated by the two vehicles 2A and 2B and the person 8. Then, the virtual plane 9 constituted by the two vehicles 2A and 2B and the person 8 can be generated and compared in each of the vehicles 2A to 2C.

As shown in FIG. 13(B), the virtual plane 9 can be generated by the two vehicles 2A and 2B and the marker 5. Then, the virtual plane 9 constituted by the two vehicles 2A and 2B and the markers 5 can be generated and compared in each of the vehicles 2A to 2C.

As shown in FIG. 13(C), the virtual plane 9 can be generated by using the single vehicle 2A, the marker 5, and the person 8. Then, the virtual plane 9 constituted by the vehicle 2A, the marker 5, and the person 8 can be generated and compared in each of the vehicles 2A to 2C.

In this manner, the road surface tilt information may be generated by using the objects other than the vehicle, and a sensor abnormality can be detected by using a comparison result for each of the above-mentioned different virtual planes.

In the example shown in FIG. 11, for each of the vehicle 2A, the vehicle 2B, and the vehicle 2C, the three-dimensional object position information of the objects present in the surrounding environment and the road surface tilt information are obtained by using the sensing data of the sensor group 20 mounted on itself.

Then, a sensor abnormality can be detected by comparing the three-dimensional object position information and the road surface tilt information with respect to a certain common sensing target.

For example, considering a relative position relationship between the three vehicles 2A to 2C as the common sensing target, virtual planes 9 are generated in the vehicles 2A to 2C, respectively, and tilts of the virtual planes 9 are compared with each other.

In a case where the tilt information of the virtual planes 9 is the same in all the vehicles 2A to 2C (in a case of matching), it can be determined that there is no sensor abnormality.

On the other hand, in a case where the acquired road surface tilt information relating to only one vehicle is different (in a case of mismatching), it can be determined that there is a possibility that an abnormality might have occurred in a sensor that is mounted on the vehicle and acquires surrounding environment information.

The control unit 25 controls the vehicle 2 in accordance with various programs.

The control unit 25 may perform cooperative control aiming at autonomous driving of performing automated driving with no driver's operation or the like by controlling, on the basis of acquired surrounding environment information of the vehicle 2, a driving force generation device (not shown) of the vehicle, a steering mechanism (not shown), a braking device (not shown), or the like. This autonomous driving requires highly accurate self-position estimation and sensors that acquire a surrounding environment are used for the self-position estimation. Therefore, it is important to detect a sensor abnormality for safe vehicle driving.

Moreover, in a case where a sensor abnormality has been detected, the control unit 25 performs sensor abnormality notification and controls the vehicle on the basis of abnormality notification information processed by the detection unit 265 of the arithmetic unit 26. The sensor abnormality notification is performed such that the driver can recognize the occurrence of the sensor abnormality. The notification is performed typically by using at least one of sound or display on a display device.

Here, the optical axes of the sensors including the camera 201, the millimeter-wave radar 202, and the LiDAR 203 can be tilt from the correct positions because of a light bump or the like. Otherwise, attachment positions of the sensors can differ from the correct positions. Such a case where the sensors are positioned tilted from the correct positions is defined as a sensor abnormality.

The abnormality notification information generated by the detection unit 265 to be described later includes sensor abnormality notification, driving mode transition notification, vehicle control information, and the like.

The sensor abnormality notification (function abnormality notification) is for notifying of the occurrence of the sensor abnormality. The sensor abnormality notification is performed on the driver of the vehicle 2 on which the sensor having an abnormality detected is mounted.

The driving mode transition notification is, for example, for notifying of transition from automated driving to manual driving. In a case where the driving mode of the vehicle 2 including the sensor having an abnormality detected has been changed due to a sensor abnormality, the driver is notified of the fact.

The vehicle control information (function limit instruction information) includes information regarding a stop instruction of the sensor use, information regarding correction data, emergency stop instruction information of the vehicle 2, information regarding a transition instruction of the driving mode of the vehicle 2, and the like.

The information regarding a stop instruction of the sensor use is an instruction to stop the use of the sensor having an abnormality detected.

The correction data is correction data for correcting an amount corresponding to a tilt from the correct position of the sensor having an abnormality detected. The vehicle control according to autonomous driving or the like may be performed by using the correction data.

The driving mode transition instruction is, for example, a vehicle instruction to perform control to transition from automated driving to manual driving.

The general-purpose communication I/F 27 is a general-purpose communication I/F that intermediates communication between various devices present in an external environment. The general-purpose communication I/F 27 may implement a cellular communication protocol such as GSM (registered trademark) (global system of mobile communications), WiMAX (registered trademark), LTE (registered trademark) (long term evolution), and LTE-A (LTE-Advanced), or a wireless LAN (also referred to as Wi-Fi (registered trademark)), another wireless communication protocol such as Bluetooth (registered trademark). The general-purpose communication I/F 27 may connect to a device (e.g., an application server or a control server) present in an external network (e.g., the Internet, a cloud network, or a network specific to a company) via a base station or an access point, for example. Moreover, the general-purpose communication I/F 27 may connect to a terminal (e.g., the driver's, pedestrian's, or store's terminal or a machine type communication (MTC) terminal) present in vicinity of the vehicle by a peer to peer (P2P) technology, for example.

The storage unit 28 stores a program for causing the information processing apparatus to perform a series of processing associated with sensor abnormality detection.

The arithmetic unit 26 includes a first data acquisition unit 261, a second data acquisition unit 262, a processing start determination unit 263, a comparison unit 264, a detection unit 265, and an instruction unit 266.

The first data acquisition unit 261 acquires first data.

The first data includes three-dimensional object position information and road surface tilt information, which are three-dimensional position information generated on the basis of sensing data acquired by sensors mounted on a vehicle that performs sensor abnormality detection processing, and a time stamp indicating the date and time of acquisition of that information.

The second data acquisition unit 262 acquires second data.

The second data includes at least one of data acquired from another vehicle or data acquired from the RSU 3.

The second data acquired from the other vehicle includes three-dimensional object position information and road surface tilt information, which are three-dimensional position information generated on the basis of sensing data acquired by sensors mounted on the other vehicle, and a time stamp indicating the date and time of acquisition of that information.

The second data acquired from the RSU 3 includes object position information generated on the basis of sensing data acquired by the sensor mounted on the RSU 3, road surface tilt information prestored in the RSU 3, and a time stamp indicating the date and time of acquisition of the object position information. As will be described later, the RSU 3 obtains the road surface tilt information in advance.

The processing start determination unit 263 determines whether or not to start the sensor abnormality detection processing. For example, the processing start determination unit 263 determines whether or not three or more sets of the first data and the second data to be compared with each other are present, and starts the processing in a case where three or more sets are present or does not start the processing in a case where two or less sets are present.

The comparison unit 264 compares the first data with the second data on the basis of the time stamps.

The detection unit 265 detects a sensor abnormality on the basis of a comparison result in the comparison unit 264. In addition, the detection unit 265 generates abnormality notification information on the basis of a result of the detection (abnormality notification processing).

The instruction unit 266 instructs the vehicle 2 and the RSU 3 to start sensing data acquisition for sensor abnormality detection.

Here, as described above, the sensor abnormality refers to a state in which the sensor is tilted from the correct position.

Figure 14:
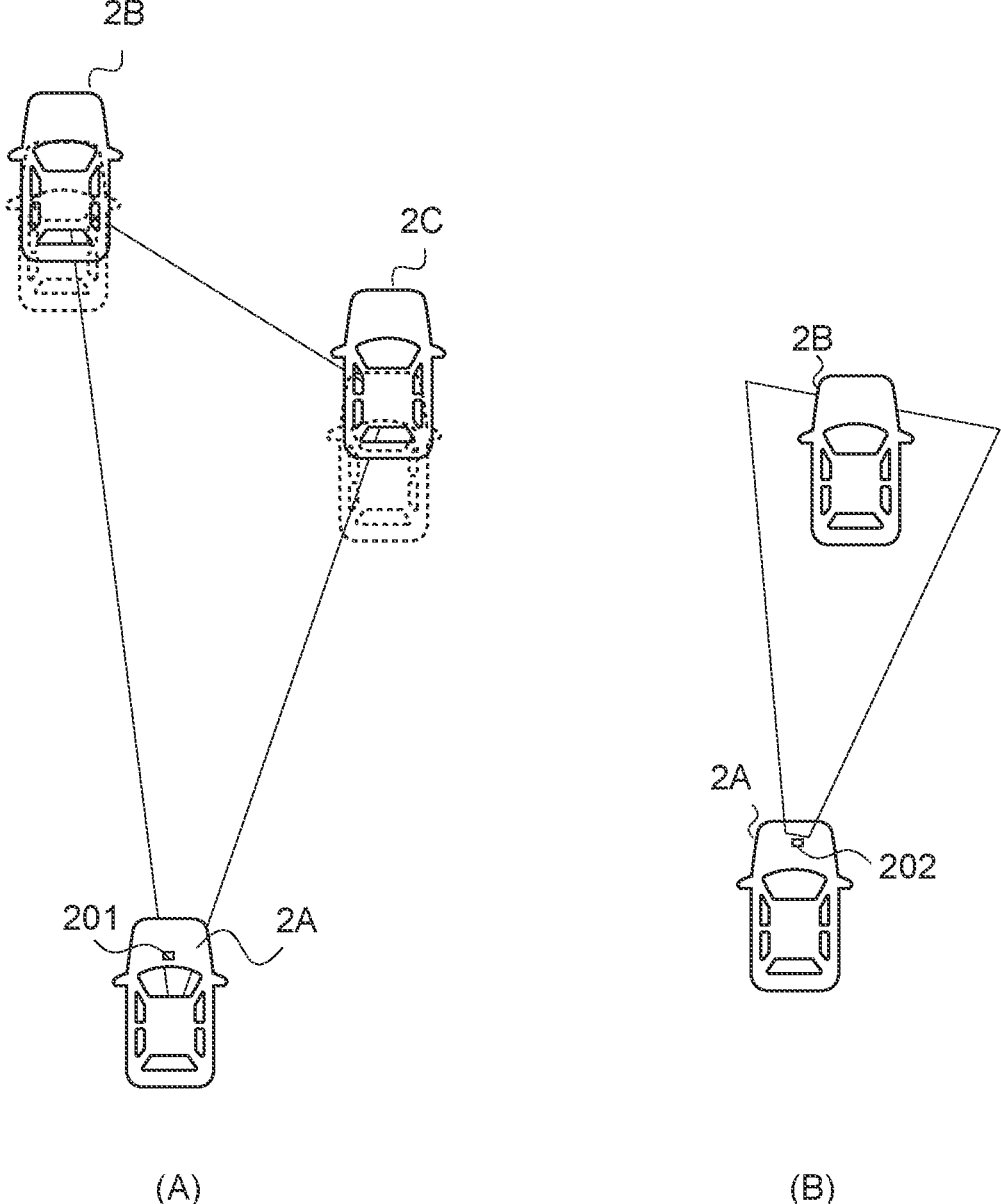
FIG. 14 A diagram describing misrecognition due to a sensor abnormality.

FIG. 14 is a diagram describing misrecognition due to a sensor abnormality.

FIG. 14(A) shows a position relationship with the other vehicle 2B, 2C as viewed from the vehicle A, which is detected from image data of the camera 201 mounted on the vehicle 2A. In the figure, the broken line denotes a correct vehicle position detected in a case where the camera 201 is located at the correct position and the solid line denotes an erroneously recognized vehicle position detected in a case where the camera 201 is tilted downward in a pitch direction.

As shown in the figure, in a case where the optical axis of the camera 201 is tilted downward in the pitch direction, the positions of the vehicles 2B and 2C are erroneously recognized to be positioned further forward than the correct position as viewed from the vehicle 2A. In this manner, a recognition result by the camera 201 is affected by the tilt of the camera 201.

FIG. 14(B) is a diagram describing a recognition result of the other vehicle 2B as viewed from the vehicle 2A, which is based on a detection result of the millimeter-wave radar 202 mounted on the vehicle 2A.

In a case where the millimeter-wave radar 202 is located at the correct position, the vehicle 2B is recognized to be positioned diagonally forward right with respect to the vehicle 2A. In this regard, in a case where the millimeter-wave radar 202 is tilted right in the yaw direction, the vehicle 2B is erroneously recognized to be positioned forward in front of the vehicle 2A. In this manner, the recognition result of the millimeter-wave radar 202 is affected by the tilt of the millimeter-wave radar 202.

The LiDAR 203 is also strongly affected by the tilt like the millimeter-wave radar 202.

Thus, the tilt of the sensor from the correct position causes optical axis deviation, and generated object position information differs from the actual object position and an accurate relative position relationship between the objects cannot be obtained. Therefore, for example, in automatic driving or the like using the sensing data of the sensor, it is very important to detect a sensor abnormality for safe driving.

By comparing the first data with the second data, abnormal data is detected and thus an abnormal sensor is detected. On the basis of this detection result, vehicle control instruction or the like is performed in addition to the sensor abnormality notification.

Moreover, in the sensors such as the camera, the millimeter-wave radar, and the LiDAR, it is very difficult to distinguish whether it is an abnormality where the sensor is tilted from the correct position or noise of sensor data that is caused by a road structure and the like such as road surface conditions.

Figure 15:
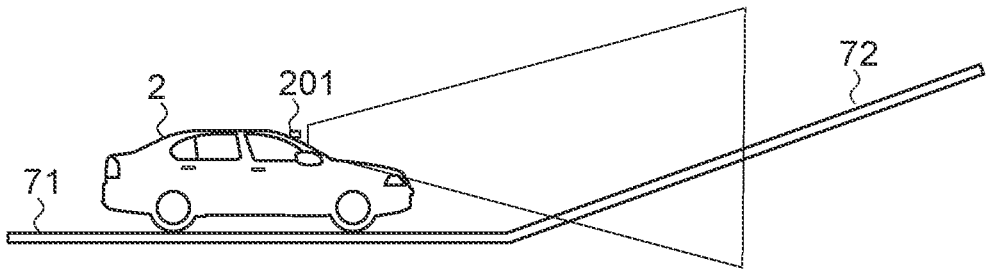
FIG. 15 A diagram for describing recognition based on sensing data of sensors.

For example, as shown in FIG. 15, it is assumed that the single vehicle 2 is located on a horizontal road surface 71 and the camera 201 images a stop sign painted on an oblique surface 72 having a grade with respect to the horizontal road surface 71 forward in the travel direction of the vehicle 2. This image data can coincide with image data obtained by imaging a stop sign painted on the horizontal road surface forward in the travel direction through the camera 201 mounted on the vehicle positioned on the horizontal road surface having no oblique surface and tilted in the pitch direction from the correct position.

Thus, it is very difficult to distinguish whether the image data obtained from the camera contains noise of sensor data that is caused by a road structure and the like such as road surface conditions or includes data caused by a sensor abnormality where the sensor is tilted. In general, by detecting the road surface for long time, whether it is caused by the road surface conditions or caused by the sensor abnormality is detected, but it takes a long time.

In this regard, in this embodiment, an abnormal sensor can be quickly detected by comparing at least one of the three-dimensional object position information or the road surface tilt information, which is generated by using sensing data of the sensors mounted on the vehicle, between the vehicles.

For comparing the road surface tilt information, it is also possible to detect a sensor abnormality by using tilt information of a road surface in a communication area of the RSU 3, which is acquired and stored by the RSU 3 in advance, other than comparing the road surface tilt information generated by the plurality of vehicles respectively as described above.

Moreover, an operation error of the sensor can also be detected in addition to the abnormality caused by the tilt of the optical axis of the sensor from the correct position.

For example, in a case where objects that cause uneven transmission, such as metal display plate and guardrails, are present in front of the millimeter-wave radar, there is a possibility that radio waves may strike such objects and be reflected in an unpredicted manner, which may result in an operation error in the millimeter-wave radar.

Also in such a case, similarly, an abnormal sensor having an operation error can be quickly detected by comparing the three-dimensional object position information and the road surface tilt information of the respective vehicles, which are generated by using the sensing data of the sensors mounted on the vehicles and the RSU.

It should be noted that for improving the detection accuracy, it is favorable to perform detection processing by using sensing data acquired for several seconds. Since errors lower than 1 Hz are caused due to vibrations of vehicles, the detection cycle is favorably equal to or higher than about 10 Hz.

[Configuration of RSU]

The RSU 3 is, for example, installed in a traffic light or the like and is arranged on the side of a road. Using the vehicle-to-infrastructure communication system, communication between the RSU 3 and the device mounted on the vehicle 2 can be performed and the driver of the vehicle 2 can obtain traffic information, driver assistance system information, and the like through the RSU 3.

As shown in FIG. 1, the RSU 3 includes a sensor 30, a data acquisition unit 31, an object position information generation unit 32, a communication unit 34, a determination unit 35, a reference time transmission unit 36, and the storage unit 37.

The sensor 30 is, for example, a stereo camera and captures image data that is surrounding information.

The data acquisition unit 31 acquires the data acquired by the sensor 30.

The communication unit 34 is configured to be capable of communication with the vehicle 2 that is the information processing apparatus and sends and receives various types of data.

Using the data acquired by the data acquisition unit 31, the object position information generation unit 32 performs object detection processing and distance-from-object detection processing and generates object position information indicating the position relationship between the objects.

For example, in the example shown in FIG. 11, image data acquired by a sensor (camera) mounted on the RSU 3 is processed to generate object position information that is the position relationship between the three vehicles 2A to 2C. It should be noted that this object position information does not include the information regarding the tilt of the road surface.

The determination unit 35 determines whether or not to start the sensing data acquisition for sensor abnormality detection. In this embodiment, the determination unit 35 determines whether or not there are three or more vehicles that generate three-dimensional object position information and road surface tilt information to be compared for the sensor abnormality detection processing. In a case where there are three or more vehicles, the sensing data acquisition starts. In a case where there are two or less vehicles, the sensing data acquisition does not start.

After determining that there are three or more vehicles, the determination unit 35 notifies each vehicle 2 via the communication unit 34 to start the sensing data acquisition for sensor abnormality detection.

Moreover, the determination unit 35 determines whether or not the vehicles 2 are positioned within a reference data range by using GPS information received from the vehicles 2. The wordings, "the vehicles are positioned within a reference data range", indicate that the vehicles are present at such positions that they can acquire position information of the markers 5 the position information of which is acquired by the RSU 3 in advance.

After determining that the vehicles are present within the reference data range, the determination unit 35 notifies the vehicles 2 to start the data acquisition for the sensor abnormality detection via the communication unit 34.

The reference time transmission unit 36 sends a reference time for data synchronization at the time of comparing the first data with the second data to the vehicles 2 via the communication unit 34.

The storage unit 37 stores the tilt information of the road surface in the communication area of the RSU 3. Moreover, the storage unit 37 acquires the position information of the two markers 5A and 5B in advance.

It should be noted that although the time stamps are acquired by the position measurement unit (GPS) in this embodiment, the time stamps are may be acquired by the vehicle-to-infrastructure communication system.

[Vehicle Control Examples]

Control examples will be described with reference to FIG. 16.

Figure 16:
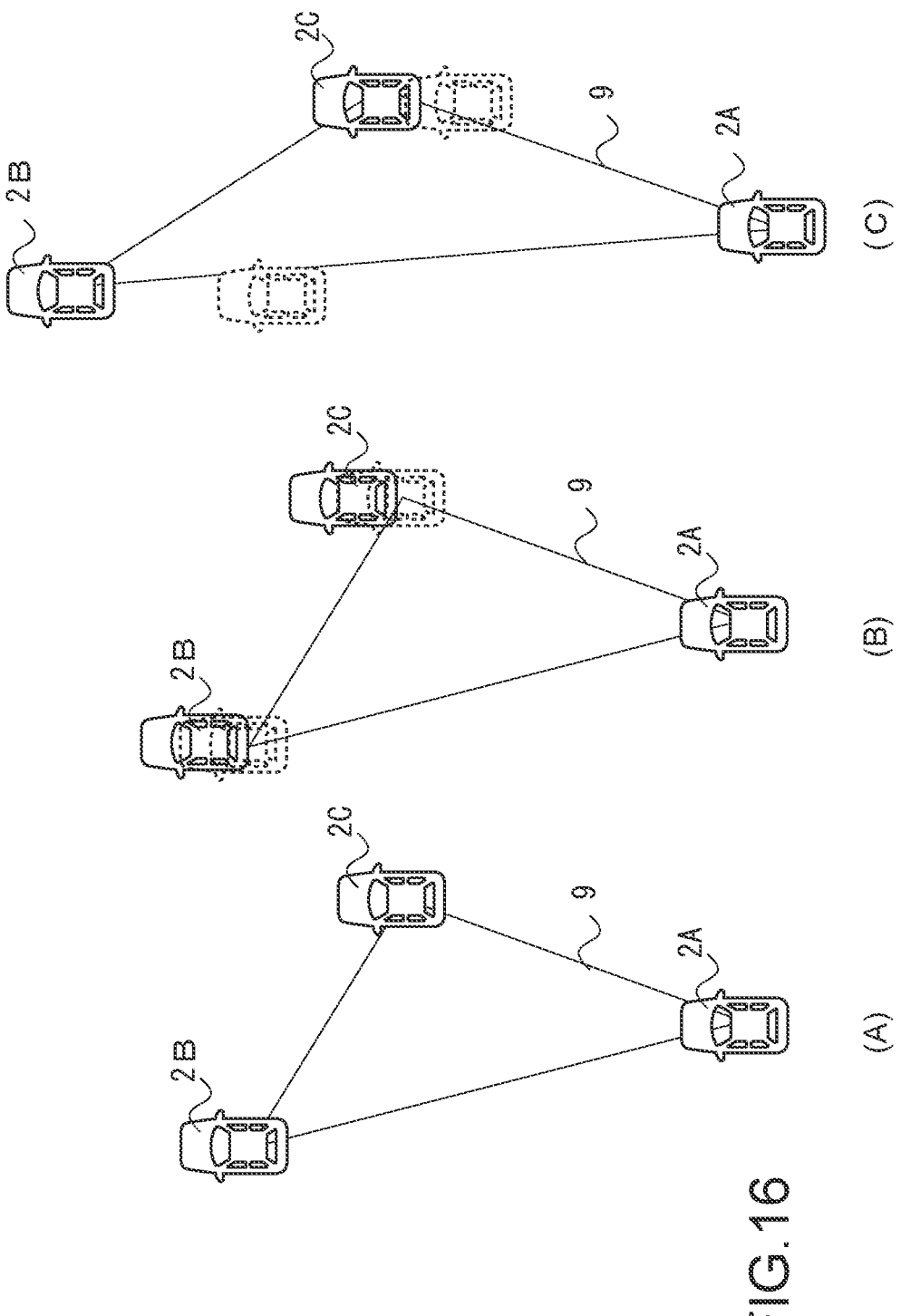
FIG. 16 A diagram for describing a vehicle control example.

(A) to (C) of FIG. 16 are all diagrams where the same road conditions are sensed.

FIG. 16(A) shows a correct position relationship between the vehicles 2A to 2C.

In FIG. 16(B), the solid line denotes a position relationship between the vehicles 2A to 2C, which is generated by using sensing data of the camera mounted on the vehicle 2A. The broken line denotes a correct position relationship between the vehicles, which is the same as FIG. 16(A).

In FIG. 16(C), the solid line denotes another example of the position relationship between the vehicles 2A to 2C generated by using the sensing data of the camera mounted on the vehicle 2A. The broken line denotes a correct position relationship between the vehicles, which is the same as FIG. 16(A).

An example in which the sensors mounted on the vehicle 2A has an abnormality and the sensors mounted on the vehicles 2B and 2C do not have an abnormality is shown.

Referring to FIG. 16(B), calculation of correction data associated with the vehicle control will be described.

The arithmetic unit 26 compares three-dimensional object position information and road surface tilt information generated by the respective vehicles 2 and extracts data (three-dimensional object position information and road surface tilt information) different from other data and having an abnormality.

The position relationship between the vehicles 2A to 2C that is generated by the vehicles 2B and 2C is the correct position relationship as shown in FIG. 16(A) and the three-dimensional object position information and the road surface tilt information are coincide between the vehicles.

Here, data on the position relationship between the vehicles 2A to 2C, which is generated by using the sensing data of the camera mounted on the vehicle 2A and shown as the solid line of FIG. 16(B), is extracted as data having an abnormality.

In the position relationship between the vehicles shown as the solid line of FIG. 16(B), the vehicles 2B and 2C are located further forward as viewed from the vehicle 2A in comparison with the correct position relationship shown in FIG. 16(A). In such a case, it is assumed that that the camera is tilted in the pitch direction.

Next, a tilt of the virtual plane connecting the vehicles 2A to 2C, which is generated by the vehicle 2A, and a tilt of the virtual plane connecting the vehicles 2A to 2C, which is generated by the vehicles 2B and 2C, are compared with each other, and a tilt of the camera mounted on the vehicle 2A is estimated on the basis of its difference. Temporary correction data is calculated by using this estimation result. Then, in a case where an error between the position relationship between the vehicles 2A to 2C when the data is corrected with the temporary correction data and the correct position relationship becomes smaller, this correction data is employed. The thus calculated correction data is sent to the vehicle having a sensor abnormality detected. Alternatively, failure information may be set to the vehicle for performing sensor stop instruction, driving mode transition instruction, or the like.

Correction data can be similarly calculated also for the millimeter-wave sensor and the LiDAR.

Referring to FIG. 16(C), another vehicle control example will be described.

The arithmetic unit 26 compares the three-dimensional object position information and the road surface tilt information that are generated by the respective vehicles 2 and extracts data having an abnormality (three-dimensional object position information and road surface tilt information), which is different from other data.

The position relationship between the vehicles 2A to 2C that is generated by the vehicles 2B and 2C is the correct position relationship as shown in FIG. 16(A).

Here, data on the position relationship between the vehicles 2A to 2C shown as the solid line of FIG. 16(C) generated by using the sensing data of the camera mounted on the vehicle 2A is extracted as the data having an abnormality. Here, a case where a tilt of the virtual plane connecting the vehicles 2A to 2C, which is generated by the vehicle 2A, and a tilt of the virtual plane connecting the vehicles 2A to 2C, which is generated by the vehicles 2B and 2C, substantially coincide with each other, and the tilt of the road surface has no problem but the position information of the vehicle 2B is largely different is assumed.

In the position relationship between the vehicles shown as the solid line of FIG. 16(C), the position error of the vehicle 2B as viewed from the vehicle 2A is larger than the position error of the vehicle 2C, as compared to the correct position relationship shown in FIG. 16(A). In such a case, it is assumed that the sensing data of the camera positioned on the left-hand side of the vehicle has an abnormality. In such a case, the sensor control is performed to stop the use of the camera positioned on the left-hand side.

Figure 18:
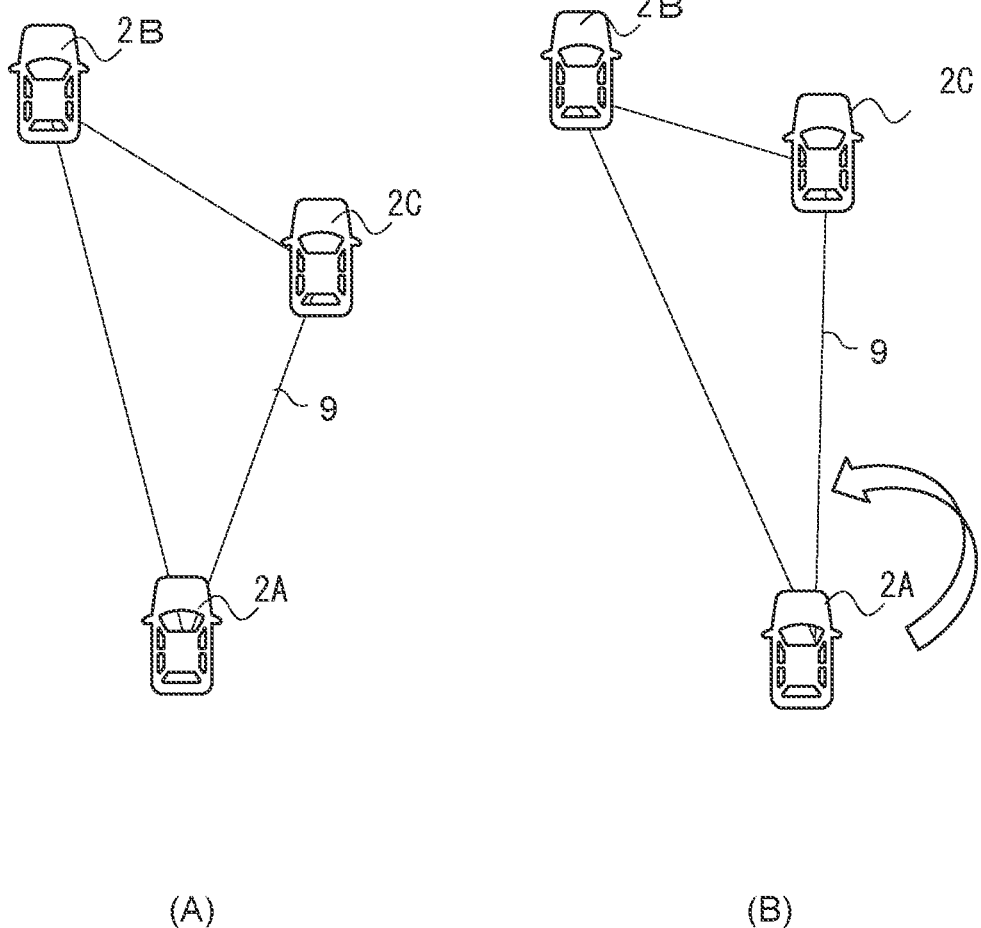
FIG. 18 A schematic diagram describing a position relationship between vehicles in a case where a sensor tilts in a yaw direction.

FIG. 18 is a diagram describing a position relationship between the vehicles in a case where the sensor is tilted in the yaw direction.

(A) and (B) of FIG. 18 are all diagrams where the same road conditions are sensed.

FIG. 18(A) shows a correct position relationship between the vehicles 2A to 2C, which is generated on the basis of sensing data of the sensor (camera) of the RSU 3.

FIG. 18(B) shows a position relationship between the vehicles 2A to 2C, which is generated on the basis of sensing data of the vehicle 2A on which the camera tilted in the yaw direction is mounted.

A plane formed connecting the vehicles 2A to 2C is defined as the virtual plane 9.

In a case where the camera is tilted in the yaw direction, the virtual plane 9 that the vehicle 2A estimates has the same tilt as the virtual plane 9 in the correct position relationship between. Therefore, an angle of rotation (tilt) in the yaw direction is estimated by comparing position information of an object detected by the vehicle 2A with data generated by the RSU 3. In a case where the angle of rotation is equal to or larger than a constant value, it is considered as an attachment error of the sensor, and correction data for correcting the tilt may be sent to the corresponding vehicle or failure information may be sent to the vehicle for performing sensor stop instruction, driving mode transition instruction, or the like.

The same applies to the millimeter-wave sensor and the LiDAR.

Hereinafter, an example of the abnormality detection method by the abnormality detection system 1 will be described, though not limited thereto.

First Example

In this example, the description will be given with reference to FIGS. 2 and 11 by exemplifying a case where the RSU 3 performs synchronization of the three-dimensional object position information and the road surface tilt information (synchronization between the first data and the second data) acquired by the respective vehicles 2.

Figure 2:
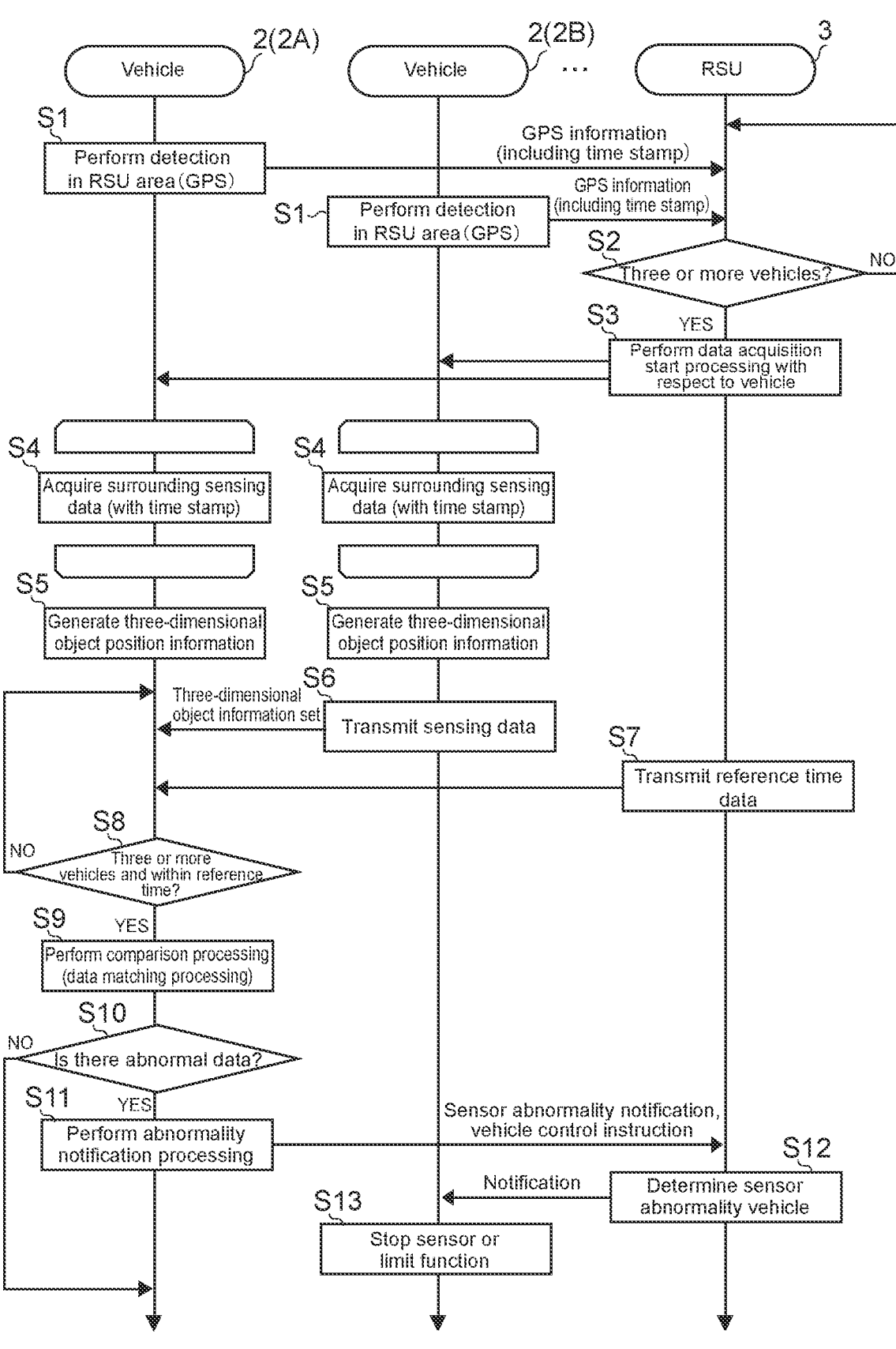
FIG. 2 A flowchart describing a first example of an abnormality detection method using the abnormality detection system according to the first embodiment.

FIG. 2 is a diagram describing a flow of the abnormality detection method in the first example. In FIG. 2, for the sake of convenience, two vehicles, the vehicle 2A and the vehicle 2B, are shown and the vehicle 2C is omitted, though a flow similar to that of the vehicle 2B is performed also in the vehicle 2C.

Here, for the sake of convenience, the description will be given by using three vehicles, the vehicles 2A to 2C, though the number of vehicles is not limited. As the number of vehicles becomes larger, the detection accuracy becomes higher. Moreover, an example in which the vehicle A performs abnormality detection processing will be shown, though another vehicle may perform the abnormality detection processing. Moreover, in FIG. 2, the description is given by showing an example in which the vehicle B has an abnormality.

When the vehicles 2A to 2C enter the area in which they can communicate with the RSU 3, the data acquisition unit 23 of each of the vehicles 2A to 2C acquires GPS information of the vehicle 2 (position information and time stamp) acquired by the mounted position measurement unit 22 (S1).

The acquired GPS information including the time stamp of each of the vehicles 2A to 2C is sent to the RSU 3.

Next, the determination unit 35 of the RSU 3 determines whether or not to start the data acquisition for the sensor abnormality detection processing (S2). Here, the determination unit 35 determines whether or not there are three or more vehicles. In a case where it is determined that there are three or more vehicles (YES), the processing proceeds to S3. In a case where it is determined that there are two or less vehicles (NO), the processing returns to S1 and the processing is repeated.

In S3, the determination unit 35 instructs each vehicle 2 to start the data acquisition for the sensor abnormality detection processing.

When each vehicle 2 receives the data acquisition start instruction, the data acquisition unit 23 of each vehicle 2 acquires GPS information with a time stamp from the position measurement unit 22 and also acquires image data and reflection wave data from the sensor group 20 (S4). The acquisition of sensing data of objects present in the periphery is performed for a predetermined time, for example, for several seconds.

Next, the three-dimensional object position information generation unit 24 of each vehicle 2 generates three-dimensional object position information and road surface tilt information by using the data acquired by the data acquisition unit 23 (S5). The GPS time (time stamp) obtained from the position measurement unit 22 is applied to the three-dimensional object position information and the road surface tilt information.

Next, the three-dimensional object position information and the road surface tilt information generated by each vehicle 2 is sent to the vehicle 2 that performs sensor abnormality detection, here, the vehicle 2A (S6). Here, the three-dimensional object position information and the road surface tilt information that are acquired by the vehicle 2A that performs sensor abnormality detection processing are defined as the first data. The three-dimensional object position information and the road surface tilt information acquired by vehicles other than the vehicle 2A, here, the vehicles 2B and 2C, is defined as the second data.

Next, the first data acquisition unit 261 of the arithmetic unit 26 of the vehicle 2A acquires the first data acquired by the vehicle 2A. The second data acquisition unit 262 acquires the second data acquired by each of the vehicles 2B and 2C.

Next, the RSU 3 sends a reference time data to be used for data synchronization at the time of data matching processing to the vehicle 2A that performs sensor abnormality detection (S7).

Next, the processing start determination unit 263 determines whether or not there are three or more vehicles and also determines whether or not it is within the reference time by using the time stamps and the reference time data applied to the first data and the second data (S8).

In a case where that it is determined that there are three or more vehicles 2 and it is determined that it is within the reference time (YES), the processing proceeds to S9.

In a case where it is determined that at least one of the condition that there are two or less vehicles 2 or the condition that it is out of the reference time is satisfied (NO), the processing returns to S6 and the processing is repeated.

In S9, the comparison unit 264 compares the acquired first data with the acquired second data (data matching processing).

In a case where the detection unit 265 determines that there is abnormal data on the basis of a comparison result in the comparison unit 264 (YES), the processing proceeds to S11. In a case where it is determined that there is no abnormal data (NO), the sensor abnormality detection processing ends. The wordings, "there is abnormal data", mean that there is a sensor tilted from the correct position.

In S11, the detection unit 265 performs abnormality notification processing based on the detection result.

In the abnormality notification processing, the vehicle on which the sensor for which it is determined that there is abnormal data is mounted is notified of the occurrence of the sensor abnormality (sensor abnormality notification) and abnormality notification information for instructing the vehicle control is generated. The abnormality notification information is sent to the RSU 3.

Based on the received abnormality notification information, the RSU 3 identifies the vehicle on which the sensor for which it is determined that there is abnormal data is mounted (S12). The RSU 3 performs sensor abnormality notification on the identified vehicle (here, the vehicle 2B) and sends information regarding the vehicle control instruction such as the sensor stop instruction.

The control unit 25 of the vehicle 2 that has received the notification performs vehicle control on the basis of the instruction (S13).

It should be noted that in the first example, the RSU 3 only needs to include at least the communication unit 34, the determination unit 35, and the reference time transmission unit 36.

Moreover, in this example, the example in which the three-dimensional object position information and the road surface tilt information are directly sent/received between the vehicles on the basis of detection results acquired by the respectively mounted sensors and the like has been shown, the transmission/reception may be performed via the RSU, for example.

Second Example

In the above-mentioned first example, the example in which the abnormality notification information generated by the vehicle 2A is sent to the other vehicle via the RSU. However, the abnormality notification information may be directly sent to the vehicle including the abnormal sensor by vehicle-to-vehicle communication with no intervention of the RSU. In the second example, an example in which the abnormality notification information is sent by vehicle-to-vehicle communication will be shown.

In addition, in the second example, an example in which object position information generated by using the sensing data of the sensor 30 of the RSU 3 and road surface tilt information obtained in the RSU 3 in advance are used in addition to the three-dimensional object position information and the road surface tilt information that are generated by the vehicles 2 will be shown.

Hereinafter, the description will be given with reference to FIGS. 3 and 11.

Figure 3:
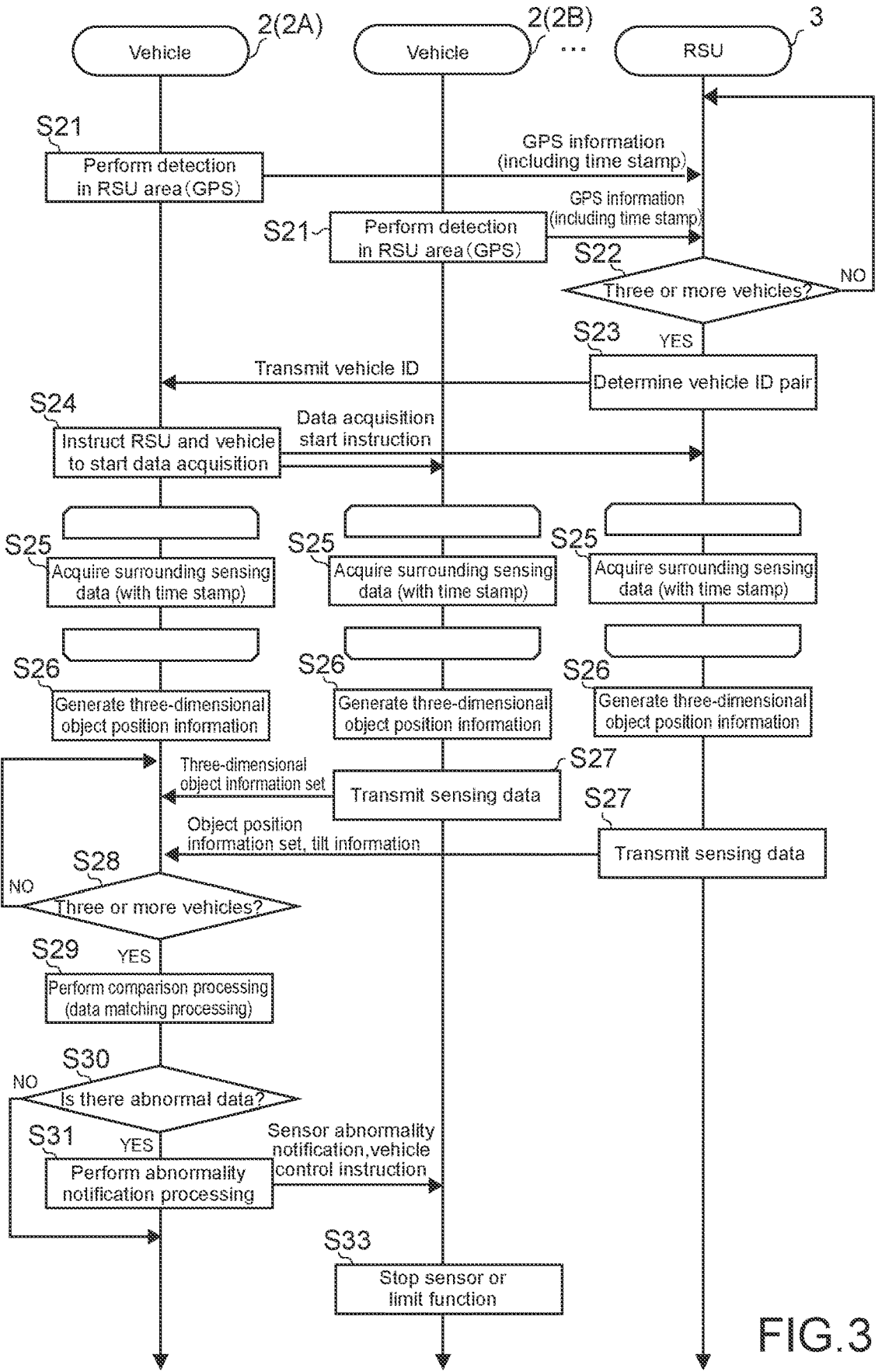
FIG. 3 A flowchart describing a second example of the abnormality detection method using the abnormality detection system according to the first embodiment.

FIG. 3 is a diagram describing a flow of abnormality detection in the second example. In FIG. 3, for the sake of convenience, two vehicles, the vehicle 2A and the vehicle 2B, are shown and the vehicle 2C is omitted, though a flow similar to that of the vehicle 2B is performed also in the vehicle 2C.

Here, for the sake of convenience, the description will be given by using three vehicles, the vehicles 2A to 2C, though the number of vehicles is not limited. Moreover, an example in which the vehicle A performs abnormality detection processing will be shown, though another vehicle may perform the abnormality detection processing. Moreover, in FIG. 3, the description is given by showing an example in which the vehicle 2B has an abnormality.

When the vehicles 2A to 2C enter the area in which they can communicate with the RSU 3, the data acquisition unit 23 of each of the vehicles 2A to 2C acquires GPS information of the vehicle 2 (position information and time stamp) acquired by the mounted position measurement unit 22 and vehicle IDs individually applied to the vehicles, respectively (S21).

The acquired GPS information including the time stamp and the acquired vehicle ID of each of the vehicles 2A to 2C are sent to the RSU 3.

Next, the determination unit 35 of the RSU 3 determines whether or not to start the data acquisition for the sensor abnormality detection processing (S22). Here, the determination unit 35 determines whether or not there are three or more vehicles. In a case where it is determined that there are three or more vehicles (YES), the processing proceeds to S23. In a case where it is determined that there are two or less vehicles (NO), the processing returns to S21 and the processing is repeated.

In S23, the determination unit 35 determines (S23) a pair of vehicle IDs, between which data is to be compared in data matching processing (S29) to be described later. The sensor abnormality detection processing is performed by using the three-dimensional object position information and the road surface tilt information that are generated by the respective vehicles in the determined pair.

The information regarding the determined pair of vehicle IDs is sent to the vehicle 2A that is the information processing apparatus that performs abnormality detection processing.

When the vehicle 2A receives the information regarding the pair of vehicle IDs from the RSU 3, the instruction unit 266 instructs each of the vehicles 2 belonging that pair and the RSU 3 to start the sensing data acquisition for sensor abnormality detection (S24).

When each vehicle 2 receives the data acquisition start instruction, the data acquisition unit 23 of each vehicle 2 acquires GPS information with a time stamp from the position measurement unit 22 and also acquires image data and reflection wave data from the sensor group 20 (S25).

When the RSU 3 receives the sensing data acquisition start instruction, the data acquisition unit 31 acquires image data with a time stamp from the sensor 30 (S25).

The acquisition of sensing data of objects present in the periphery is performed for a predetermined time, for example, for several seconds.

Next, in each vehicle 2, the three-dimensional object position information generation unit 24 generates three-dimensional object position information and road surface tilt information by using the sensing data acquired by the data acquisition unit 23 (S26). Time stamps are applied to the three-dimensional object position information and the road surface tilt information.

In the RSU 3, the object position information generation unit 32 generates object position information by using the data acquired by the data acquisition unit 31 (S26). Time stamps are applied to the object position information.

Next, the three-dimensional object position information and the road surface tilt information generated by the respective vehicles 2 are sent to the vehicle 2 that performs sensor abnormality detection, here, the vehicle 2A (S27). Time stamps are applied to the three-dimensional object position information and the road surface tilt information.

In addition, the object position information generated by the RSU 3 and the road surface tilt information stored in the storage unit 37 of the RSU 3 are sent to the vehicle 2A (S27). Time stamps are applied to the object position information.

Here, the three-dimensional object position information and the road surface tilt information that are acquired by the vehicle 2A are defined as the first data. The three-dimensional object position information and the road surface tilt information that are acquired by the vehicles 2B and 2C other than the vehicle 2A are defined as the second data. The object position information and the road surface tilt information acquired by the RSU 3 are defined as the second data.

Next, the first data acquisition unit 261 of the arithmetic unit 26 of the vehicle 2A acquires the first data. The second data acquisition unit 262 acquires the second data acquired by each of the vehicles 2B and 2C and the second data acquired by the RSU 3.

Next, the processing start determination unit 263 determines whether or not there are three or more vehicles (S28). In a case where it is determined that there are three or more vehicles (YES), the processing proceeds to S29. In a case where it is determined that there are two or less vehicles (NO), the processing returns to S27 and the processing is repeated.

In S29, the comparison unit 264 compares the acquired first data with the acquired second data (data matching processing).

Next, the detection unit 265 determines the presence/absence of abnormal data on the basis of a comparison result in the comparison unit 264 (S30).

In a case where it is determined in S30 that there is abnormal data (YES), the processing proceeds to S31. In a case where it is determined that there is no abnormal data (NO), the sensor abnormality detection processing ends.

In a case where the detection unit 265 determines that there is abnormal data on the basis of the comparison result in the comparison unit 264 (YES), the processing proceeds to S31. In a case where it is determined that there is no abnormal data (NO), the sensor abnormality detection processing ends.

In S31, the detection unit 265 performs abnormality notification processing based on the detection result.

In the abnormality notification processing, the vehicle on which the sensor for which it is determined that there is abnormal data is mounted is notified of the occurrence of the sensor abnormality (sensor abnormality notification) and the vehicle control is instructed. In this example, the detection unit 265 performs sensor abnormality notification on the vehicle 2B on which the sensor for which it is determined that there is an abnormality is mounted and sends the information regarding the vehicle control instruction thereto by vehicle-to-vehicle communication.

The control unit 25 of the vehicle 2B that has received the notification controls the vehicle on the basis of the instruction (S32).

It should be noted that in a case where the data acquired by the RSU 3 is ground truth, the three-dimensional object position information acquired by the RSU 3 can be master data, i.e., reference data (correct reference data). Moreover, the road surface tilt information obtained by the RSU 3 in advance is reference data (correct reference data).

By comparing the reference data of the RSU 3 with the data acquired by the vehicle 2 on the basis of the time stamp, an abnormality of the sensors mounted on the vehicle 2 can be detected. Moreover, correction data can be calculated on the basis of a difference between the data.

Third Example

In this example, only one vehicle performs abnormality detection processing by using reference data received from the RSU 3. The reference data is position information of the markers 5A and 5B.

Hereinafter, the description will be given with reference to FIGS. 4 and 17.

Figure 4:
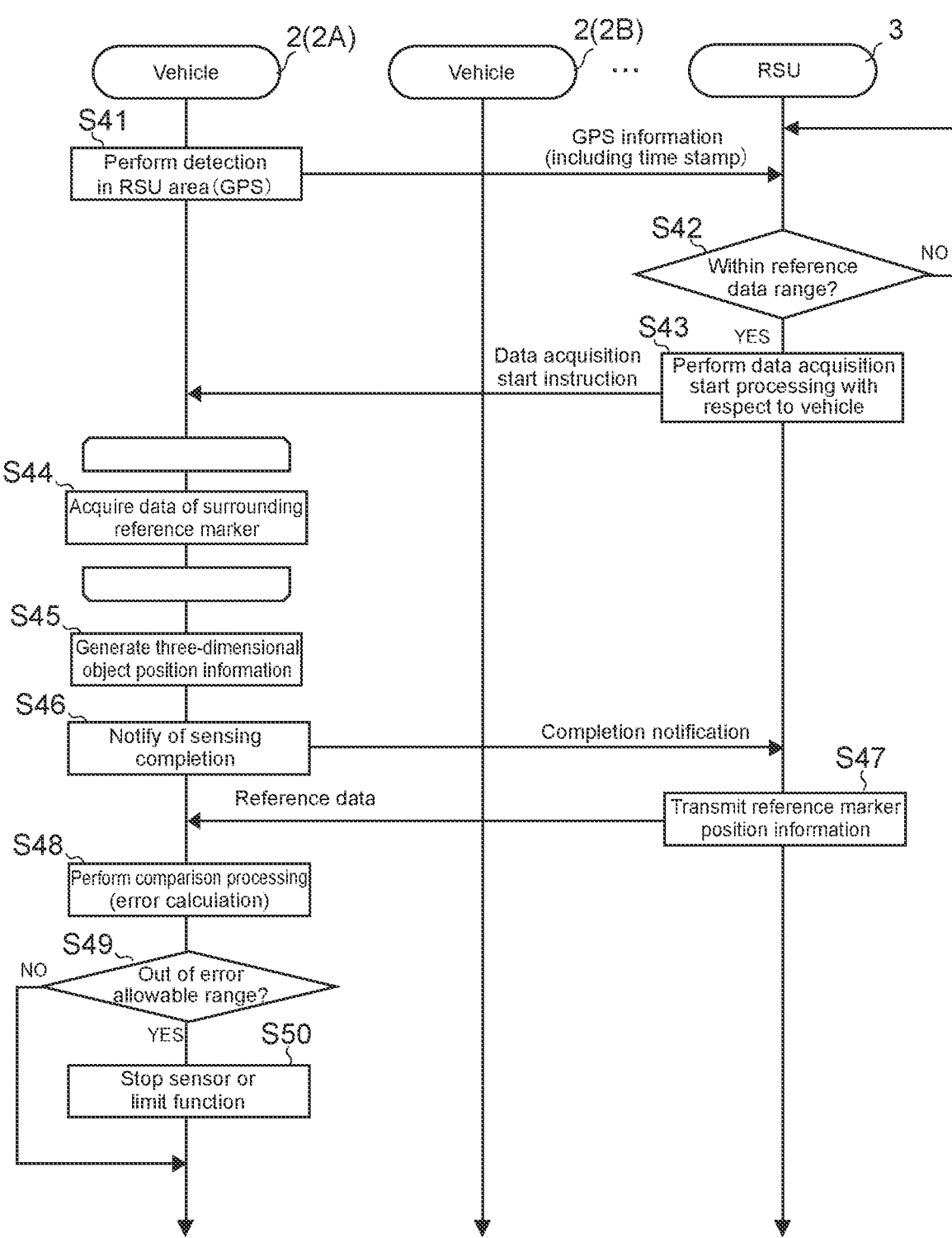
FIG. 4 A flowchart describing a third example of the abnormality detection method using the abnormality detection system according to the first embodiment.

FIG. 4 is a diagram describing a flow of abnormality detection in the third example.

Figure 17:
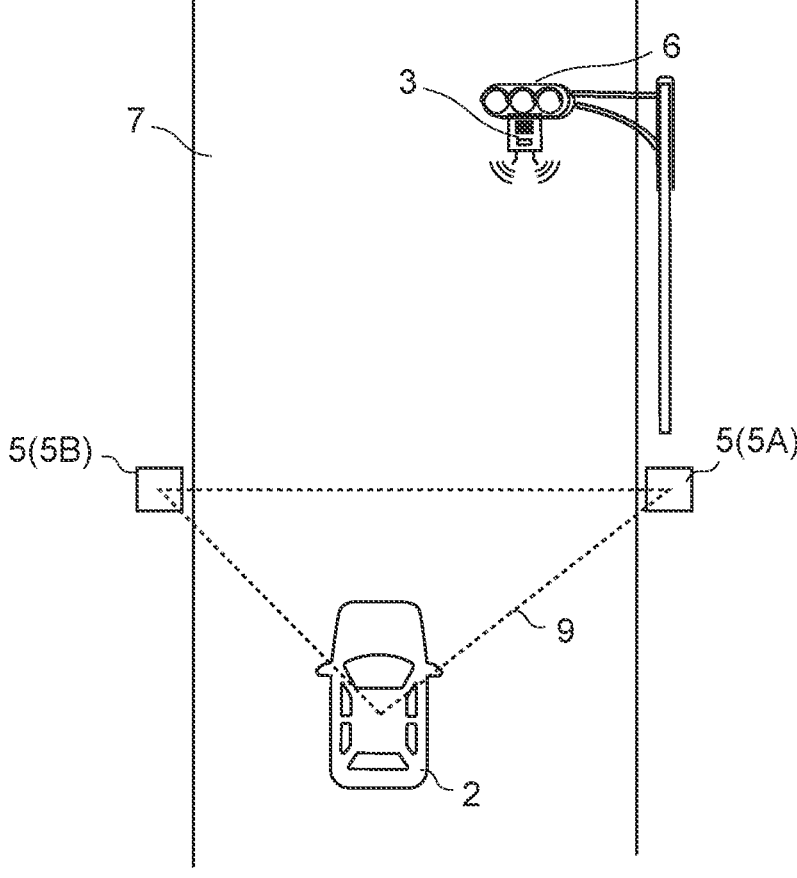
FIG. 17 A schematic diagram of an environment example for describing a third example of the abnormality detection method.

FIG. 17 is a schematic diagram showing a situation where one vehicle 2 is running on the road 7 in which the RSU 3 is installed. Two markers 5 the positions of which are known and fixed are arranged in vicinity of the RSU 3. The markers 5 are arranged at positions easy for the vehicle 2 to detect the markers 5 and are positioned within a communication area of the RSU 3.

Hereinafter, the description will be given following the flow of FIG. 4.

As shown in FIG. 4, when the vehicle 2A enters the area in which it can communicate with the RSU 3, the data acquisition unit 23 of the vehicle 2 acquires GPS information of the vehicle 2 (position information and time stamp) acquired by the mounted position measurement unit 22 (S41).

The acquired GPS information including the time stamp is sent to the RSU 3.

Next, the determination unit 35 of the RSU 3 determines whether or not the vehicle 2 is within the reference data range (S42). In a case where it is determined that the vehicle 2 is not within the range (NO), the processing returns to S41. In a case where it is determined that the vehicle 2 is within the range (YES), the processing proceeds to S43.

In S43, the determination unit 35 instructs the vehicle 2A to start the data acquisition for the sensor abnormality detection processing.

When the vehicle 2A receives the data acquisition start instruction from the RSU 3, the data acquisition unit 23 acquires image data and reflection wave data related to the markers 5 that are surrounding reference markers, which are acquired by the sensor group 20 (S44). The acquisition of sensing data of objects present in the periphery is performed for a predetermined time, for example, for several seconds.

Next, in the vehicle 2, the three-dimensional object position information generation unit 24 generates three-dimensional object position information by using the data acquired by the data acquisition unit 23 (S45).

When the generation of the three-dimensional object position information is completed, a sensing completion notification is sent to the RSU 3 (S46).

When the RSU 3 receives the sensing completion notification, the RSU 3 sends position information (reference data) of the markers 5, which is obtained by the RSU 3 in advance, to the vehicle 2A (S47).

Next, the first data acquisition unit 261 of the arithmetic unit 26 of the vehicle 2A acquires the three-dimensional object position information related to the markers 5 that is the first data acquired by the vehicle 2A. The second data acquisition unit 262 acquires the position information (reference data) of the markers 5 that is the second data obtained by the RSU 3 in advance.

Next, the comparison unit 264 compares the first data with the second data and calculates an error.

Next, the detection unit 265 determines whether or not the error calculated on the basis of the comparison result in the comparison unit 264 is out of an allowable range. In a case where the detection unit 265 determines that the error is out of the allowable range (YES), the processing proceeds to S49, considering that the sensor has an abnormality. In a case where it is determined that the error is within the allowable range (NO), the sensor abnormality detection processing ends, considering that the sensor has no abnormality.

In S49, the control unit 25 notifies the driver of the vehicle 2 of the sensor abnormality and instructs the vehicle control.

Also in second and third embodiments below, as in the first embodiment, an abnormal sensor can be quickly detected by comparing the first data with the second data. Hereinafter, descriptions will be given with reference to the drawings. Here, points different from those of the above-mentioned embodiment will be mainly described and configurations similar to the above-mentioned embodiment will be denoted by similar reference signs and the descriptions will be omitted in some cases.

Second Embodiment

[Schematic Configuration of Abnormality Detection System]

An abnormality detection system according to the embodiment of the present technology will be described with reference to FIG. 5.

In this embodiment, an example in which the arithmetic unit 26 is a server 4 other than the vehicle will be shown. FIG. 5 is a schematic configuration diagram of an abnormality detection system 101 according to the second embodiment.

Figure 5:
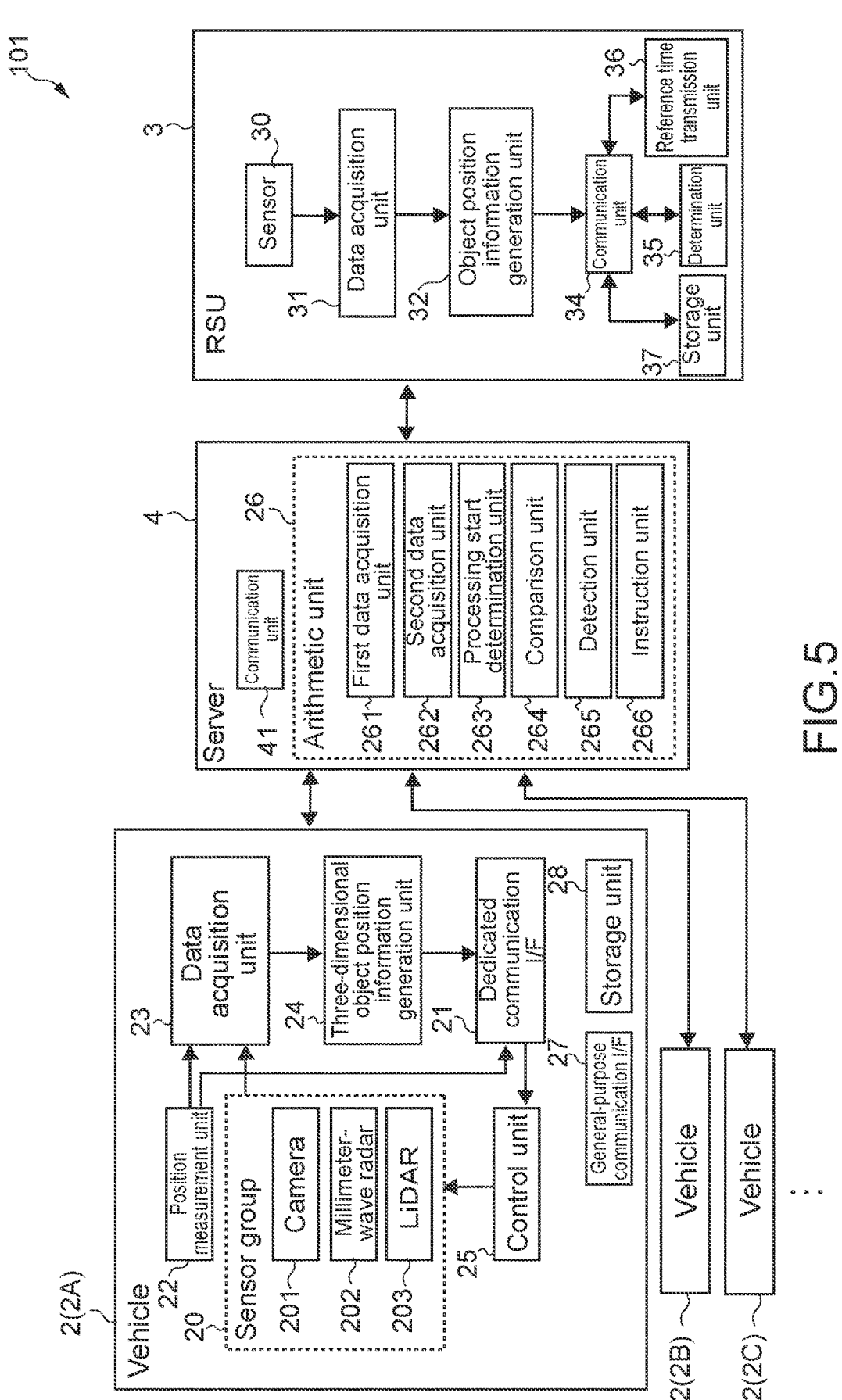
FIG. 5 A schematic configuration diagram of an abnormality detection system according to a second embodiment of the present technology.

As shown in FIG. 5, the abnormality detection system 101 includes one or more vehicles 2, an RSU 3, and the server 4 that is the information processing apparatus. Also in the abnormality detection system 101 in this embodiment, the use under the environment as shown in FIG. 11, for example, is assumed as in the first embodiment.

[Configuration of Vehicle]

As shown in FIG. 5, the vehicle 2 includes a sensor group 20, a dedicated communication I/F 21, a position measurement unit 22, a data acquisition unit 23, a three-dimensional object position information generation unit 24, a control unit 25, a general-purpose communication I/F 27, and a storage unit 28.

The dedicated communication I/F 21 is capable of transmitting and receiving data between the vehicle 2 and the RSU 3.

For example, the vehicle 2 sends a GPS information including the time stamp that is acquired by the position measurement unit 22, to the RSU 3.

The vehicle 2 receives a data acquisition start processing instruction from the RSU 3.

The vehicle 2 receives abnormality notification information from the RSU 3.

The control unit 25 controls the vehicle 2 in accordance with various programs.

The control unit 25 may perform cooperative control aiming at autonomous driving of performing automated driving with no driver's operation or the like by controlling, on the basis of acquired surrounding environment information of the vehicle 2, a driving force generation device (not shown) of the vehicle, a steering mechanism (not shown), a braking device (not shown), or the like.

Moreover, the control unit 25 performs sensor abnormality notification and controls the vehicle on the basis of abnormality notification information processed by the detection unit 265 of the arithmetic unit 26 of the server 4.

The general-purpose communication I/F 27 is a general-purpose communication I/F that intermediates communication between various devices present in an external environment. The general-purpose communication I/F 27 may implement a cellular communication protocol such as GSM (registered trademark) (global system of mobile communications), WiMAX (registered trademark), LTE (registered trademark) (long term evolution), and LTE-A (LTE-Advanced), or a wireless LAN (also referred to as Wi-Fi (registered trademark)), another wireless communication protocol such as Bluetooth (registered trademark). The general-purpose communication I/F 27 may connect to a device (e.g., an application server or a control server) present in an external network (e.g., the Internet, a cloud network, or a network specific to a company) via a base station or an access point, for example. Moreover, the general-purpose communication I/F 27 may connect to a terminal (e.g., the driver's, pedestrian's, or store's terminal or a machine type communication (MTC) terminal) present in vicinity of the vehicle by a peer to peer (P2P) technology, for example.

The general-purpose communication I/F 27 performs data transmission/reception between the vehicle 2 and the server 4.

For example, the vehicle 2 sends the three-dimensional object position information and the road surface tilt information to the server 4.

The vehicle 2 receives the data acquisition start instruction from the server 4.

The vehicle 2 receives the abnormality notification information from the server 4.

[Configuration of Server]

The server 4 includes a communication unit 41 and an arithmetic unit 26.

The data transmission/reception is performed between the server 4 and the vehicle 2 or the RSU 3 via the communication unit 41.

The server 4 receives reference time data to be used for data synchronization at the time of data matching processing, from the RSU 3.

The server 4 receives information regarding a pair of vehicle IDs of the vehicles, which is used at the time of data matching processing, from the RSU 3.

The server 4 sends the data acquisition start instruction to the vehicle 2 and the RSU 3.

The server 4 receives the three-dimensional object position information and the road surface tilt information from the vehicle 2 and the RSU 3.

The server 4 sends the sensor abnormality notification information performed by the arithmetic unit 26, to the RSU 3.

The arithmetic unit 26 detects a sensor abnormality in accordance with a program for performing a series of processing associated with sensor abnormality detection, which is stored in the storage unit 28. The server 4 including the arithmetic unit 26 is an information processing apparatus that performs sensor abnormality detection processing.

The arithmetic unit 26 includes a first data acquisition unit 261, a second data acquisition unit 262, a processing start determination unit 263, a comparison unit 264, a detection unit 265, and an instruction unit 266.

The first data acquisition unit 261 acquires first data.

The first data includes three-dimensional object position information and road surface tilt information, which are generated on the basis of sensing data acquired by sensors mounted on an arbitrary vehicle, and a time stamp indicating the date and time of acquisition of that information.

The second data acquisition unit 262 acquires second data.

The second data includes at least one of data acquired from a vehicle other than the arbitrary vehicle or data acquired from the RSU 3.

The second data acquired from the vehicle other than the arbitrary vehicle includes three-dimensional object position information and road surface tilt information, which are generated on the basis of sensing data acquired by sensors mounted on the vehicle, and a time stamp indicating the date and time of acquisition of that information.

The second data acquired from the RSU 3 includes object position information generated on the basis of sensing data acquired by the sensor mounted on the RSU 3, road surface tilt information prestored in the RSU 3, and a time stamp indicating the date and time of acquisition of the object position information.

[Configuration of RSU]

As shown in FIG. 5, the RSU 3 includes a sensor 30, a data acquisition unit 31, an object position information generation unit 32, a communication unit 34, a determination unit 35, a reference time transmission unit 36, and a storage unit 37.

Hereinafter, the abnormality detection method by the abnormality detection system 101 will be described, though not limited thereto.

Fourth Example

In this example, the description will be given with reference to FIGS. 6, 7, and 11 by exemplifying a case where the RSU 3 performs synchronization of the three-dimensional object position information and the road surface tilt information (synchronization between the first data and the second data) acquired by each vehicle 2.

Figure 6:
FIG. 6 A flowchart describing a fourth example of an abnormality detection method using the abnormality detection system according to the second embodiment.
Figure 7:
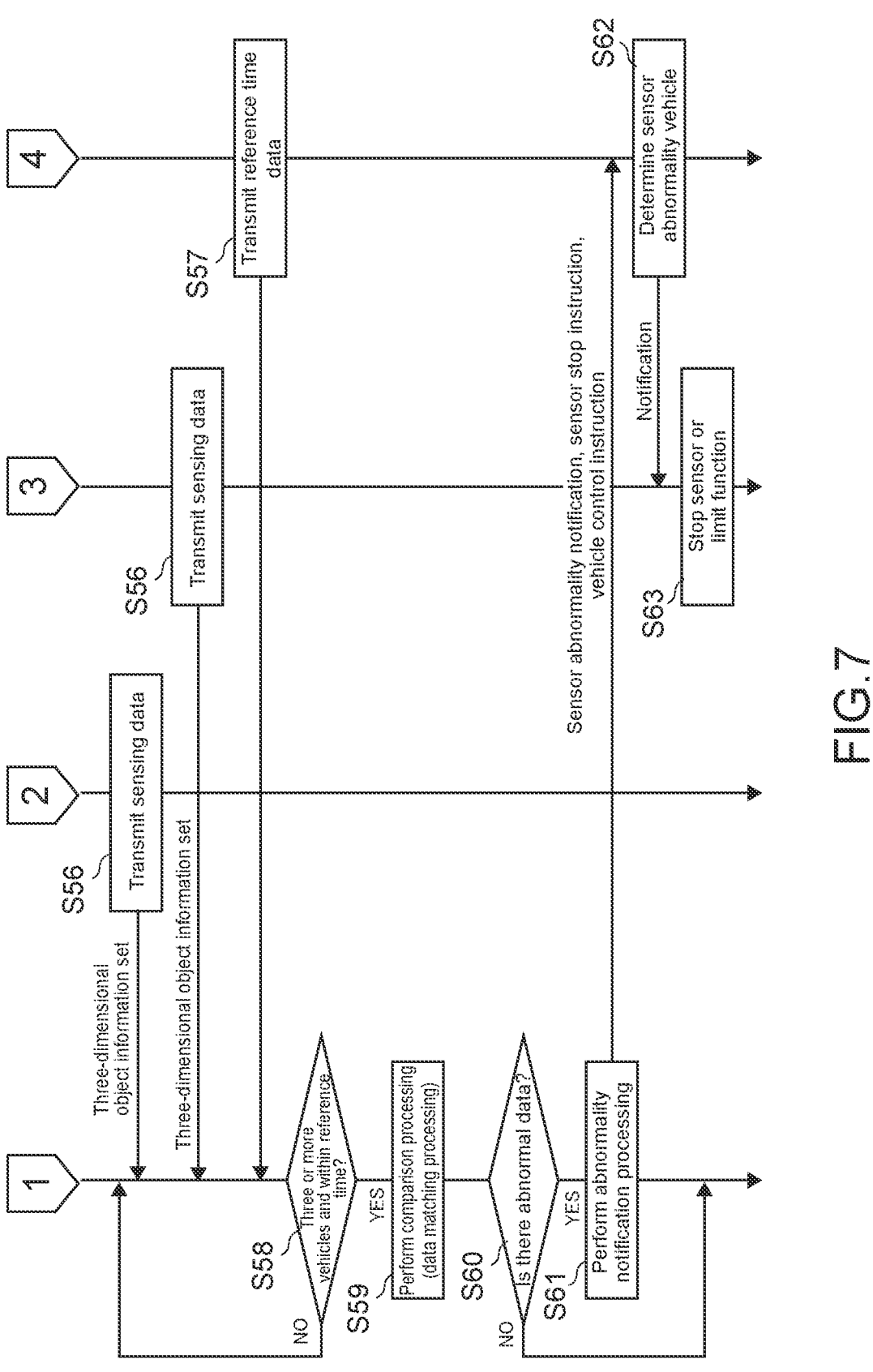
FIG. 7 A flowchart following the flowchart of FIG. 6.

FIG. 6 is a diagram describing a flow of the abnormality detection method in the fourth example. FIG. 7 is a flowchart following FIG. 6. In FIGS. 6 and 7, for the sake of convenience, two vehicles, the vehicle 2A and the vehicle 2B, are shown and the vehicle 2C is omitted, though a flow similar to that of the vehicle 2B is performed also in the vehicle 2C.

Here, for the sake of convenience, the description will be given by using three vehicles, the vehicles 2A to 2C, though the number of vehicles is not limited. Moreover, an example in which the vehicle A performs abnormality detection processing will be shown, though another vehicle may perform the abnormality detection processing. Moreover, in FIG. 2, the description is given by showing an example in which the vehicle B has an abnormality.

When the vehicles 2A to 2C enter the area in which they can communicate with the RSU 3, the data acquisition unit 23 of each of the vehicles 2A to 2C acquires GPS information of the vehicle 2 (position information and time stamp) acquired by the mounted position measurement unit 22 (S51).

The acquired GPS information including the time stamp of each of the vehicles 2A to 2C is sent to the RSU 3.

Next, the determination unit 35 of the RSU 3 determines whether or not to start the data acquisition for the sensor abnormality detection processing (S52). Here, the determination unit 35 determines whether or not there are three or more vehicles. In a case where it is determined that there are three or more vehicles (YES), the processing proceeds to S53. In a case where it is determined that there are two or less vehicles (NO), the processing returns to S51 and the processing is repeated.

In S53, the determination unit 35 instructs each vehicle 2 to start the data acquisition for the sensor abnormality detection processing.

When each vehicle 2 receives the data acquisition start instruction, the data acquisition unit 23 of each vehicle 2 acquires GPS information with a time stamp from the position measurement unit 22 and also acquires image data and reflection wave data from the sensor group 20 (S54). The acquisition of sensing data of objects present in the periphery is performed for a predetermined time, for example, for several seconds.

Next, the three-dimensional object position information generation unit 24 of each vehicle 2 generates three-dimensional object position information and road surface tilt information by using the data acquired by the data acquisition unit 23 (S55). The GPS time (time stamp) obtained from the position measurement unit 22 is applied to the three-dimensional object position information and the road surface tilt information.

Next, the three-dimensional object position information and the road surface tilt information generated by the respective vehicles 2 are sent to the server 4 (S56). Here, the three-dimensional object position information and the road surface tilt information that are acquired by the vehicle 2A are defined as the first data. The three-dimensional object position information and the road surface tilt information acquired by vehicles other than the vehicle 2A, here, the vehicles 2B and 2C are defined as the second data.

Next, the first data acquisition unit 261 of the arithmetic unit 26 of the vehicle 2A acquires the first data acquired by the vehicle 2A. The second data acquisition unit 262 acquires the second data acquired by each of the vehicles 2B and 2C.

Next, the RSU 3 sends the reference time data to be used for data synchronization at the time of data matching processing, to the server 4 (S57).

Next, the processing start determination unit 263 determines whether or not there are three or more vehicles and also determines whether or not it is within the reference time by using the time stamps and the reference time data applied to the three-dimensional object position information and the road surface tilt information (S58).

In a case where that it is determined that there are three or more vehicles 2 and it is determined that it is within reference time (YES), the processing proceeds to S59.

In a case where it is determined that at least one of the condition that there are two or less vehicles 2 or the condition that it is out of the reference time is satisfied (NO), the processing returns to S56 and the processing is repeated.

In S59, the comparison unit 264 compares the acquired first data with the acquired second data (data matching processing).

Next, the detection unit 265 determines the presence/absence of abnormal data on the basis of the comparison result in the comparison unit 264 (S60).

In a case where it is determined in S60 that there is abnormal data (YES), the processing proceeds to S61. In a case where it is determined that there is no abnormal data (NO), the sensor abnormality detection processing ends. The wordings, "there is abnormal data", mean that there is a sensor tilted from the correct position.

In S61, the detection unit 265 performs abnormality notification processing based on the detection result.

In the abnormality notification processing, the vehicle on which the sensor for which it is determined that there is abnormal data is mounted is notified of the occurrence of the sensor abnormality (sensor abnormality notification) and the vehicle control is instructed. Such abnormality notification information is sent to the RSU 3.

The RSU 3 determines, on the basis of the received information, the vehicle on which the sensor for which it is determined that there is abnormal data is mounted (S62). The RSU 3 performs sensor abnormality notification on the identified vehicle (here, the vehicle 2B) and sends the information regarding the vehicle control instruction thereto.

The control unit 25 of the vehicle 2 that has received the notification controls the vehicle on the basis of the instruction (S63).

It should be noted that in the fourth example, the RSU 3 only needs to include at least the communication unit 34, the determination unit 35, and the reference time transmission unit 36.

Fifth Example

In the above-mentioned fourth example, the example in which the abnormality notification information processed by the server 4 is sent to the vehicle 2 via the RSU 3 has been shown. However, the abnormality notification information processed by the server 4 may be directly sent to the vehicle including the abnormal sensor by vehicle-to-vehicle communication with no intervention of the server 4. In the fifth example, an example in which the abnormality notification information is sent by vehicle-to-vehicle communication will be shown.

In addition, in the fifth example, an example in which object position information generated by using the sensing data of the sensor 30 of the RSU 3 and road surface tilt information obtained by the RSU 3 in advance are used in addition to the three-dimensional object position information and the road surface tilt information that are generated by the vehicles 2 will be shown.

Hereinafter, the description will be given with reference to FIGS. 8, 9, and 11.

Figure 8:
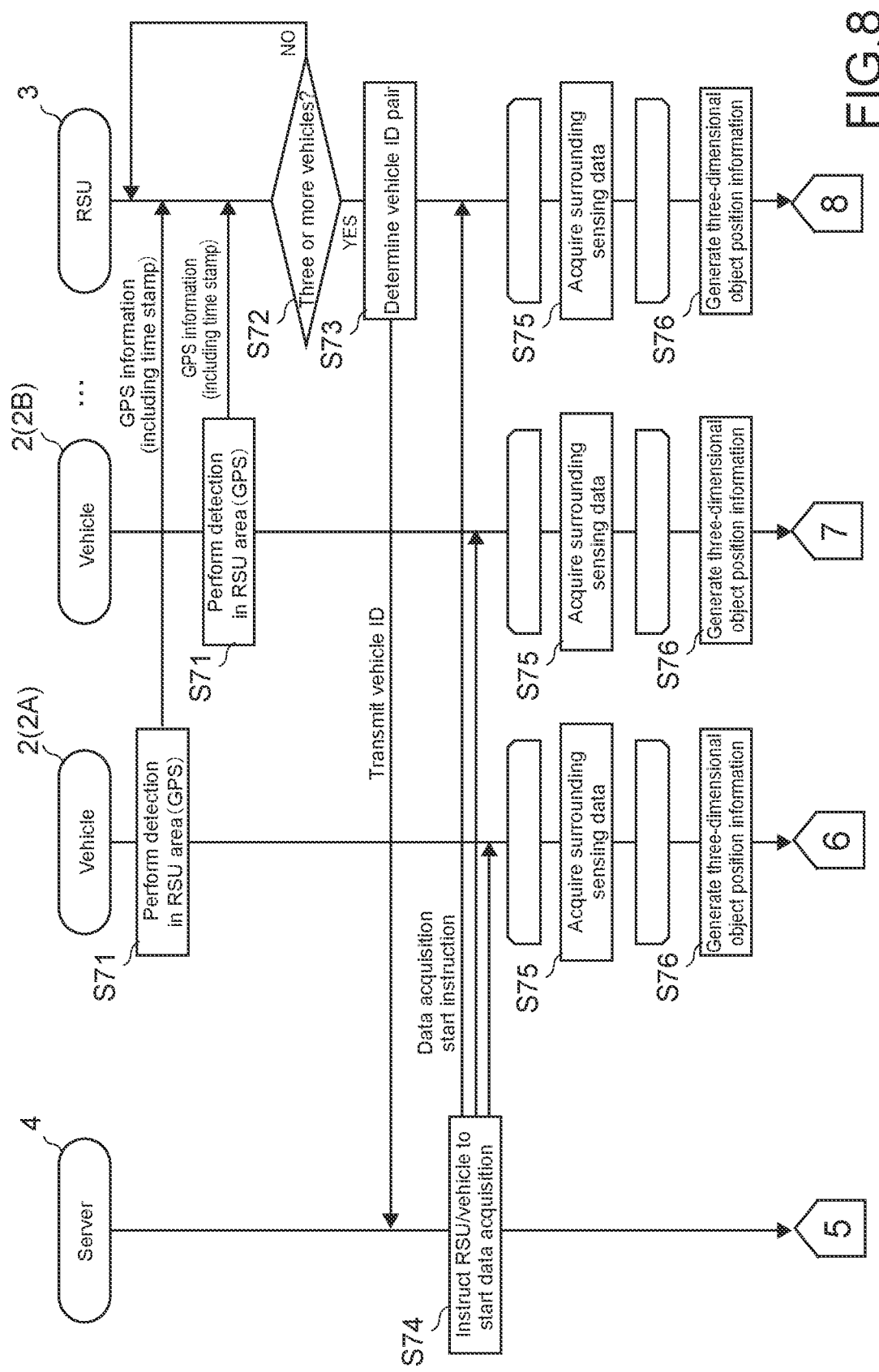
FIG. 8 A flowchart describing a fifth example of the abnormality detection method using the abnormality detection system according to the second embodiment.
Figure 9:
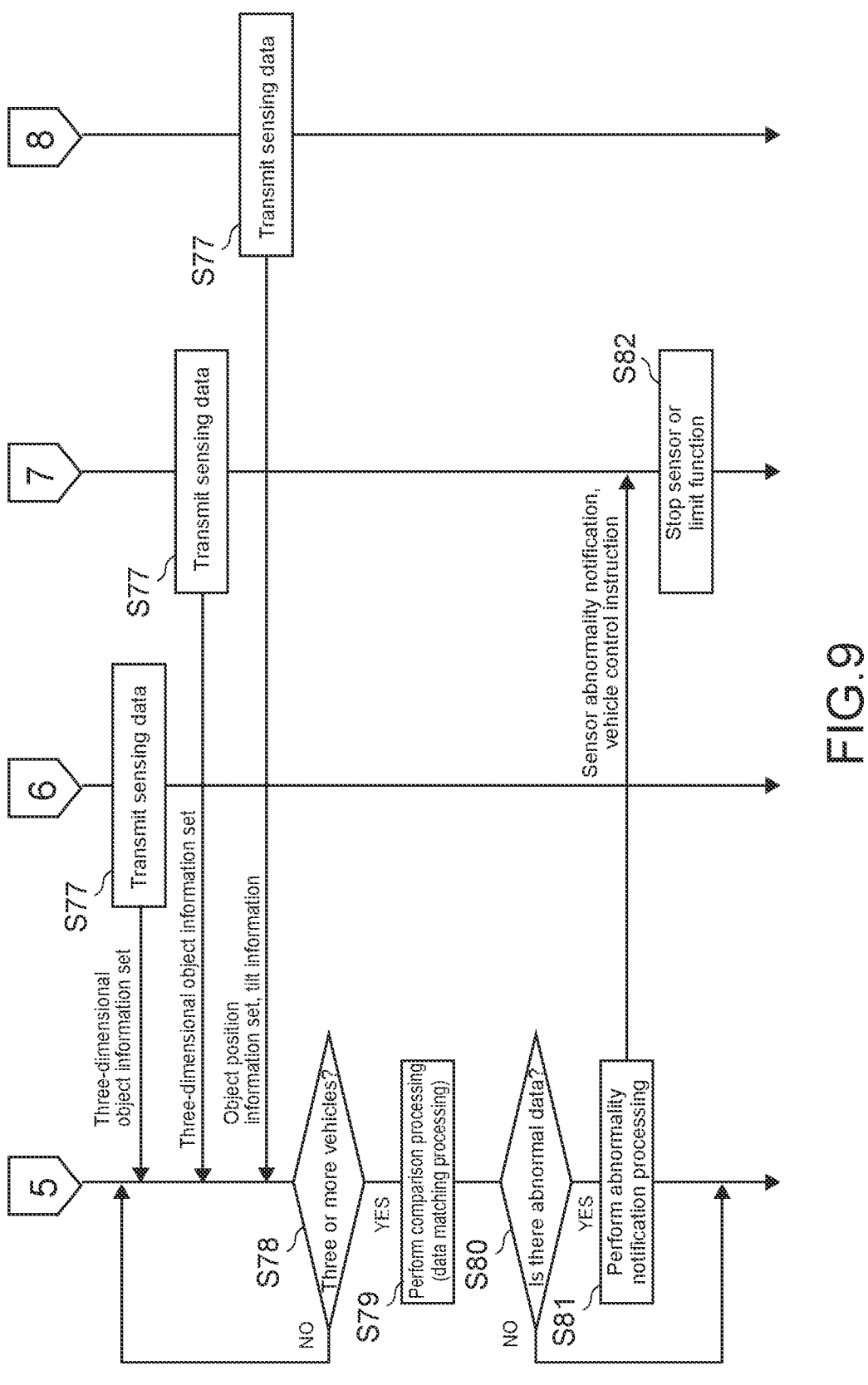
FIG. 9 A flowchart following the flowchart of FIG. 8.

FIG. 8 is a diagram describing a flow of abnormality detection in the fifth example and FIG. 9 is a flowchart following FIG. 8. In FIGS. 8 and 9, for the sake of convenience, two vehicles, the vehicle 2A and the vehicle 2B, are shown and the vehicle 2C is omitted, though a flow similar to that of the vehicle 2B is performed also in the vehicle 2C.

Here, for the sake of convenience, the description will be given by using three vehicles, the vehicles 2A to 2C, though the number of vehicles is not limited. Moreover, an example in which the vehicle A performs abnormality detection processing will be shown, though another vehicle may perform the abnormality detection processing. Moreover, in FIGS. 8 and 9, the description is given by showing an example in which the vehicle B has an abnormality.

When the vehicles 2A to 2C enter the area in which they can communicate with the RSU 3, the data acquisition unit 23 of each of the vehicles 2A to 2C acquires GPS information of the vehicle 2 (position information and time stamp) acquired by the mounted position measurement unit 22 and vehicle IDs individually applied to the vehicles, respectively (S71).

The acquired GPS information including the time stamp and the acquired vehicle ID of each of the vehicles 2A to 2C are sent to the RSU 3.

Next, the determination unit 35 of the RSU 3 determines whether or not to start the data acquisition for the sensor abnormality detection processing (S72). Here, the determination unit 35 determines whether or not there are three or more vehicles. In a case where it is determined that there are three or more vehicles (YES), the processing proceeds to S73. In a case where it is determined that there are two or less vehicles (NO), the processing returns to S71 and the processing is repeated.

In S73, the determination unit 35 determines (S73) a pair of vehicle IDs for comparing data with each other in data matching processing (S79) to be described later. The sensor abnormality detection processing is performed by using the three-dimensional object information set generated by the respective vehicles in the determined pair.

The information regarding the determined pair of vehicle IDs is sent to the server 4.

When the server 4 receives the information regarding the pair of vehicle IDs from the RSU 3, the instruction unit 266 instructs each of the vehicles 2 belonging that pair and the RSU 3 to start the sensing data acquisition for sensor abnormality detection (S74).

When each vehicle 2 receives the data acquisition start instruction, the data acquisition unit 23 of each vehicle 2 acquires GPS information with a time stamp from the position measurement unit 22 and also acquires image data and reflection wave data from the sensor group 20 (S75).

When the RSU 3 receives the sensing data acquisition start instruction, the data acquisition unit 31 acquires image data with a time stamp from the sensor 30 (S75).

The acquisition of sensing data of objects present in the periphery is performed for a predetermined time, for example, for several seconds.

Next, in each vehicle 2, the three-dimensional object position information generation unit 24 generates three-dimensional object position information and road surface tilt information by using the sensing data acquired by the data acquisition unit 23 (S76). Time stamps are applied to the three-dimensional object position information and the road surface tilt information.

Also in the RSU 3, the object position information generation unit 32 generates object position information by using the data acquired by the data acquisition unit 31 (S76). Time stamps are applied to the object position information.

Next, the three-dimensional object position information and the road surface tilt information generated by the respective vehicles 2 are sent to the server 4 (S77). Time stamps are applied to the three-dimensional object position information and the road surface tilt information.

In addition, the object position information generated by the RSU 3 and the road surface tilt information stored in the storage unit 37 of the RSU 3 are sent to the server 4 (S77). Time stamps are applied to the object position information.

Here, the three-dimensional object position information and the road surface tilt information that are acquired by the arbitrary vehicle, here, the vehicle 2A are defined as the first data. The three-dimensional object position information and the road surface tilt information that are acquired by the vehicles 2B and 2C other than the vehicle 2A are defined as the second data. The object position information and the road surface tilt information acquired by the RSU 3 are defined as the second data.

Next, the first data acquisition unit 261 of the arithmetic unit 26 acquires the first data acquired by the vehicle 2A. The second data acquisition unit 262 acquires the second data acquired by each of the vehicles 2B and 2C and the second data acquired by the RSU 3.

Next, the processing start determination unit 263 determines whether or not there are three or more vehicles (S78). In a case where it is determined that there are three or more vehicles (YES), the processing proceeds to S79. In a case where it is determined that there are two or less vehicles (NO), the processing returns to S77 and the processing is repeated.

In S79, the comparison unit 264 compares the acquired first data with the acquired second data (data matching processing).

The detection unit 265 determines the presence/absence of abnormal data on the basis of the comparison result in the comparison unit 264 (S80).

In a case where it is determined in S80 that there is abnormal data (YES), the processing proceeds to S81. In a case where it is determined that there is no abnormal data (NO), the sensor abnormality detection processing ends.

In S81, the detection unit 265 performs abnormality notification processing based on the detection result.

In the abnormality notification processing, the vehicle on which the sensor for which it is determined that there is abnormal data is mounted is notified of the occurrence of the sensor abnormality (sensor abnormality notification) and the vehicle control is instructed. In this example, the detection unit 265 performs sensor abnormality notification on the vehicle 2B on which the sensor for which it is determined that there is an abnormality is mounted and sends the information regarding the vehicle control instruction thereto.

The control unit 25 of the vehicle 2B that has received the notification controls the vehicle on the basis of the instruction (S82).

Third Embodiment

In the above-mentioned embodiments, the descriptions have been given by exemplifying the case where the arithmetic unit is located in the vehicle or the server. However, the arithmetic unit 26 may be located in the RSU 3 as in the third embodiment shown in FIG. 10, and it will be described below.

Figure 10:
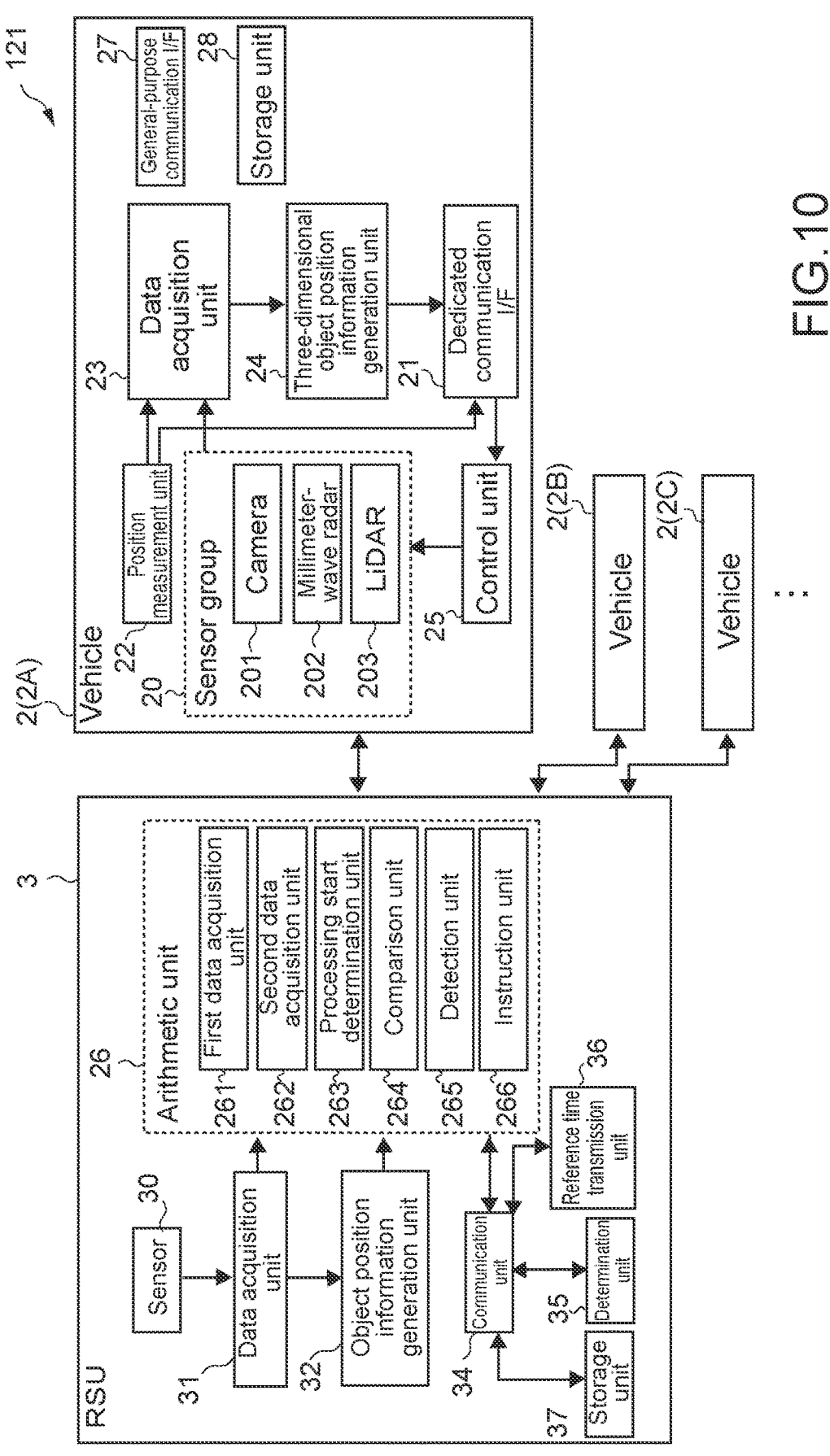
FIG. 10 A schematic configuration diagram of an abnormality detection system according to a third embodiment of the present technology.

As shown in FIG. 10, an abnormality detection system 121 according to this embodiment includes one or more vehicles 2 and a RSU 3 which are information processing apparatuses.

The RSU 3 includes a sensor 30, a data acquisition unit 31, an object position information generation unit 32, a communication unit 34, a determination unit 35, a reference time transmission unit 36, a storage unit 37, and an arithmetic unit 26.

The vehicle 2 includes a sensor group 20, a dedicated communication I/F 21, a position measurement unit 22, a data acquisition unit 23, a three-dimensional object position information generation unit 24, and a control unit 25.

As described above, in the present technology, because of sharing the sensing data, a sensor abnormality can be quickly detected, and the safety for vehicle driving can be improved.

Embodiments of the present technology are not limited to the above-mentioned embodiments, and various modifications can be made without departing from the gist of the present technology.

For example, in the above-mentioned embodiments, the example in which the camera mounted on the vehicle is the stereo camera has been shown, though not limited thereto. For example, the camera mounted on the vehicle may be a monocular camera, an RGB camera, or a ToF camera. For example, in a case where the monocular camera is used, the present technology can also be applied in a case of performing detection by using two-dimensional object position information generated on the basis of sensing data of the monocular camera. It should be noted that as in the above-mentioned embodiments, highly accurate detection can be performed by performing sensor abnormality detection by using the three-dimensional object position information as the position information.

Moreover, for example, in the above-mentioned embodiments, the descriptions have been given by exemplifying the camera, the millimeter-wave radar, and the LiDAR as the sensors, though the present technology may be applied in a case of using at least one of those sensors.

Moreover, in a case where a plurality of sensors is used, fusion data integrating sensor data obtained from each of the plurality of sensors, which is generated by a technology called sensor fusion, may be used. Accordingly, highly accurate object recognition can be performed.

As the integrated sensor data, data locally preprocessed at each of individual sensors, which is called processing data, may be used or data not subjected to local preprocessing at each of individual sensors, which is called raw data (unprocessed data, primary data), may be used.

In a case where the processing data is used, the processing data is preprocessed locally and unnecessary information including noise and the like is omitted. Therefore, the load imposed on processing at the post stage is light and the processing can be performed at a relatively high speed.

On the other hand, in a case where the raw data is used, the raw data has a large amount of information because it is never preprocessed locally and fusion data having a large amount of information can be generated as compared to a case where the processing data is used.

Moreover, any one of the plurality of sensors may be processing data and fusion data may be generated by using raw data for another one.

Moreover, for example, in the above-mentioned embodiments, the example in which an abnormality of the sensors mounted on the vehicle is detected, though it is also possible to detect an abnormality of the sensor mounted on the RSU 3.

By comparing the object position information generated by using the sensing data of the sensor mounted on the RSU 3 with the three-dimensional object position information generated by using the sensing data of the sensors mounted on the vehicle 2, an abnormality of the sensor mounted on the RSU 3 can be detected.

When the RSU 3 itself, a traffic light installing the RSU 3, or the like is tilted due to diastrophism such as an earthquake, a heavy wind, a trick, or the like, the sensor mounted on the RSU 3 is sometimes tilted due to the tilt.

Moreover, in the above-mentioned embodiments, for example, the example in which the position relationship between the vehicles 2A to 2C with respect to the RSU 3 is acquired by image processing of the image data of the sensor (camera) 30 mounted on the RSU 3 has been shown, though not limited thereto. For example, the position relationship may be acquired from the GPS information of each of the vehicles 2A to 2C in a manner that depends on the road surface conditions. Moreover, the position relationship between the RSU 3 and the vehicle 2 may be acquired by using the vehicle-to-infrastructure communication system.

It should be noted that the present technology may also take the following configurations.

(1) An information processing apparatus, including:

a first data acquisition unit that acquires first data including at least one of position information of an object present in a vehicle surrounding environment or road surface tilt information and a time stamp indicating date and time of acquisition of the information, the position information and the road surface tilt information being generated by using sensing data of one or more sensors mounted on a vehicle;

a second data acquisition unit that acquires second data including at least one of position information of an object present in a vehicle surrounding environment or road surface tilt information and the time stamp indicating the date and time of acquisition of the information, the position information and the road surface tilt information being generated by using sensing data of one or more sensors other than those of the vehicle;

a comparison unit that compares the first data with the second data on the basis of the time stamp included in each of the first data and the second data; and a detection unit that detects an abnormality related to a sensor mounted on the vehicle on the basis of a comparison result by the comparison unit.

(2) The information processing apparatus according to (1), in which the position information is three-dimensional position information.

(3) The information processing apparatus according to (1) or (2), in which the time stamp is acquired by a global navigation satellite system (GNSS) or a vehicle-to-infrastructure communication system.

(4) The information processing apparatus according to any one of (1) to (3), in which the sensor includes at least one of a camera, a millimeter-wave radar, or light detection and ranging (LiDAR).

(5) The information processing apparatus according to any one of (1) to (4), in which the second data acquisition unit acquires the second data from at least one of another vehicle different from the vehicle or a road-side unit.

(6) The information processing apparatus according to (5), in which the second data acquisition unit acquires, from the road-side unit, information regarding a tilt of a road surface on which the vehicle is positioned, as the second data, the information being acquired by the road-side unit in advance.

(7) The information processing apparatus according to (5) or (6), in which the second data acquisition unit acquires position information of an object as the second data, the position information being generated by using sensing data of a sensor mounted on the road-side unit, and the comparison unit compares the first data with the second data by using the second data acquired from the road-side unit as master data.

(8) The information processing apparatus according to any one of (1) to (7), in which the comparison unit compares the first data with the second data each of which is acquired for a predetermined time.

(9) The information processing apparatus according to any one of (1) to (8), in which the object present in the vehicle surrounding environment is a marker the position of which is known and fixed.

(10) The information processing apparatus according to any one of (1) to (9), in which the second data acquisition unit acquires, from a road-side unit that acquires position information of the marker in advance, the position information of the marker as the second data.

(11) The information processing apparatus according to any one of (1) to (10), in which the position information of the object present in the vehicle surrounding environment is generated through detection of a feature amount of the object.

(12) The information processing apparatus according to any one of (1) to (11), in which the detection unit detects an abnormality in which the sensor is tilted from a correct position.

(13) The information processing apparatus according to any one of (1) to (10), in which the detection unit controls the vehicle on the basis of a result of the detection.

(14) The information processing apparatus according to (13), in which the detection unit controls, on the basis of a result of the detection, the vehicle to correct the tilt of the sensor from the correct position.

(15) The information processing apparatus according to (13), in which the detection unit controls use/non-use of the sensor on the basis of a result of the detection.

(16) The information processing apparatus according to (13), in which the detection unit performs, on the basis of a result of the detection, control of at least one of sensor abnormality generation notification, emergency stop of the vehicle, transition of a driving mode of the vehicle, or transition notification of the driving mode of the vehicle.

(17) An information processing method, including:

acquiring first data including at least one of position information of an object present in a vehicle surrounding environment or road surface tilt information and a time stamp indicating date and time of acquisition of the information, the position information and the road surface tilt information being generated by using sensing data of one or more sensors mounted on a vehicle;

acquiring second data including at least one of position information of an object present in a vehicle surrounding environment or road surface tilt information and the time stamp indicating the date and time of acquisition of the information, the position information and the road surface tilt information being generated by using sensing data of one or more sensors other than those of the vehicle;

comparing the first data with the second data on the basis of the time stamp included in each of the first data and the second data; and detecting an abnormality related to a sensor mounted on the vehicle on the basis of the comparison result.

(18) A program that causes an information processing apparatus to execute processing including the steps of:

acquiring first data including at least one of position information of an object present in a vehicle surrounding environment or road surface tilt information and a time stamp indicating date and time of acquisition of the information, the position information and the road surface tilt information being generated by using sensing data of one or more sensors mounted on a vehicle;

acquiring second data including at least one of position information of an object present in a vehicle surrounding environment or road surface tilt information and the time stamp indicating the date and time of acquisition of the information, the position information and the road surface tilt information being generated by using sensing data of one or more sensors other than those of the vehicle;

comparing the first data with the second data on the basis of the time stamp included in each of the first data and the second data; and detecting an abnormality related to a sensor mounted on the vehicle on the basis of the comparison result.

REFERENCE SIGNS LIST 2 vehicle (information processing apparatus)
3 RSU (information processing apparatus)
4 server (information processing apparatus)
261 first data acquisition unit
262 second data acquisition unit
254 comparison unit
265 detection unit

The invention claimed is:

1. An information processing apparatus, comprising:
circuitry configured to:
   acquire first data including at least one of position information of an object present in a vehicle surrounding environment or road surface tilt information and a time stamp indicating date and time of acquisition of the information, the position information and the road surface tilt information being generated by using sensing data of one or more sensors mounted on a vehicle;
   acquire second data including at least one of position information of the object present in the vehicle surrounding environment or road surface tilt information and the time stamp indicating the date and time of acquisition of the information, the position information and the road surface tilt information being generated by using sensing data of one or more sensors other than those of the vehicle;
   acquire, from an information processing device installed along a road surface and that acquires position information of a marker in advance, the position information of the marker as the second data;
   compare the first data with the second data on a basis of the time stamp included in each of the first data and the second data;
   detect an abnormality related to a sensor mounted on the vehicle on a basis of a result of the comparison;
   start the acquiring of the first data based on the vehicle being positioned within a reference data range in which the vehicle can acquire the position information of the marker;
   determine a completion of the acquiring of the first data based on the first data being acquired for a predetermined period of time; and
   start the acquiring of the second data from the information processing device installed along the road surface based on the determined completion.

2. The information processing apparatus according to claim 1, wherein
   the position information includes three-dimensional position information.

3. The information processing apparatus according to claim 1, wherein
   the time stamp is acquired by a global navigation satellite system (GNSS) or a vehicle-to-infrastructure communication system.

4. The information processing apparatus according to claim 1, wherein
   the sensor is at least one of a camera, a millimeter-wave radar, or light detection and ranging (LiDAR).

5. The information processing apparatus according to claim 1, wherein
   the circuitry is further configured to acquire the second data from at least one of another vehicle different from the vehicle or the information processing device.

6. The information processing apparatus according to claim 5, wherein
   the circuitry is further configured to acquire, from the information processing device, information regarding a tilt of the road surface on which the vehicle is positioned, as the second data, the information being acquired by the information processing device in advance.

7. The information processing apparatus according to claim 5, wherein
   the circuitry is further configured to;
   acquire position information of an object as the second data, the position information being generated by using sensing data of a sensor mounted on the information processing device; and
   compare the first data with the second data by using the second data acquired from the information processing device as master data.

8. The information processing apparatus according to claim 1, wherein
   the circuitry is further configured to compare the first data with the second data each of which is acquired for a predetermined time.

9. The information processing apparatus according to claim 1, wherein the object present in the vehicle surrounding environment is the marker, a position of the marking being known and fixed.

10. The information processing apparatus according to claim 1, wherein the position information of the object present in the vehicle surrounding environment is generated through detection of a feature amount of the object.

11. The information processing apparatus according to claim 1, wherein the circuitry is further configured to detect an abnormality in which the sensor is tilted from a correct position.

12. The information processing apparatus according to claim 11, wherein the circuitry is further configured to control the vehicle on a basis of a result of the detection.

13. The information processing apparatus according to claim 12, wherein the circuitry is further configured to control, on a basis of a result of the detection, the vehicle to correct the tilt of the sensor from the correct position.

14. The information processing apparatus according to claim 12, wherein the circuitry is further configured to control use/non-use of the sensor on a basis of a result of the detection.

15. The information processing apparatus according to claim 12, wherein the circuitry is further configured to perform, on the basis of the result of the detection, control of at least one of sensor abnormality generation notification, emergency stop of the vehicle, transition of a driving mode of the vehicle, or transition notification of the driving mode of the vehicle.

16. An information processing method, comprising:

acquiring first data including at least one of position information of an object present in a vehicle surrounding environment or road surface tilt information and a time stamp indicating date and time of acquisition of the information, the position information and the road surface tilt information being generated by using sensing data of one or more sensors mounted on a vehicle;

acquiring second data including at least one of position information of the object present in the vehicle surrounding environment or road surface tilt information and the time stamp indicating the date and time of acquisition of the information, the position information and the road surface tilt information being generated by using sensing data of one or more sensors other than those of the vehicle;

acquiring, from an information processing device installed along a road surface and that acquires position information of a marker in advance, the position information of the marker as the second data;

comparing the first data with the second data on a basis of the time stamp included in each of the first data and the second data;

detecting an abnormality related to a sensor mounted on the vehicle on a basis of a result of the comparison;

starting the acquiring of the first data based on the vehicle being positioned within a reference data range in which the vehicle can acquire the position information of the marker;

determining a completion of the acquiring of the first data based on the first data being acquired for a predetermined period of time; and starting the acquiring of the second data from the information processing device installed along the road surface based on the determined completion.

17. A non-transitory computer-readable medium having embodied thereon a program, which when executed by a computer causes the computer to execute an information processing method, the method comprising:

acquiring first data including at least one of position information of an object present in a vehicle surrounding environment or road surface tilt information and a time stamp indicating date and time of acquisition of the information, the position information and the road surface tilt information being generated by using sensing data of one or more sensors mounted on a vehicle;

acquiring second data including at least one of position information of the object present in the vehicle surrounding environment or road surface tilt information and the time stamp indicating the date and time of acquisition of the information, the position information and the road surface tilt information being generated by using sensing data of one or more sensors other than those of the vehicle;

acquiring, from an information processing device installed along a road surface and that acquires position information of a marker in advance, the position information of the marker as the second data;

comparing the first data with the second data on a basis of the time stamp included in each of the first data and the second data;

detecting an abnormality related to a sensor mounted on the vehicle on a basis of a result of the comparison;

starting the acquiring of the first data based on the vehicle being positioned within a reference data range in which the vehicle can acquire the position information of the marker;

determining a completion of the acquiring of the first data based on the first data being acquired for a predetermined period of time; and starting the acquiring of the second data from the information processing device installed along the road surface based on the determined completion.

* * * * *